US008400264B2

(12) United States Patent
Mullet et al.

(10) Patent No.: US 8,400,264 B2
(45) **Date of Patent: *Mar. 19, 2013**

(54) SYSTEM AND METHODS FOR AUTOMATICALLY MOVING ACCESS BARRIERS INITIATED BY MOBILE TRANSMITTER DEVICES

(75) Inventors: Willis J. Mullet, Gulf Breeze, FL (US); Jason L. Mamaloukas, Pensacola, FL (US); James S. Murray, Milton, FL (US)

(73) Assignee: Homerun Holdings Corporation, Pensacola, FL (US)

( * ) Notice: Subject to any disclaimer, the term of this patent is extended or adjusted under 35 U.S.C. 154(b) by 1240 days.

This patent is subject to a terminal disclaimer.

(21) Appl. No.: 11/999,536

(22) Filed: Dec. 6, 2007

(65) Prior Publication Data

US 2008/0088410 A1 Apr. 17, 2008

Related U.S. Application Data

(62) Division of application No. 11/211,297, filed on Aug. 24, 2005, now Pat. No. 7,327,107.

(51) Int. Cl.
*B60R 25/00* (2006.01)
*G05B 19/00* (2006.01)
*G06F 7/00* (2006.01)
*H04B 1/00* (2006.01)

(52) U.S. Cl. ...................... 340/5.71; 340/5.26; 340/5.61

(58) Field of Classification Search ................. 340/5.71, 340/5.26, 5.61, 686.1; 318/280, 282, 283; 49/340; 455/420, 418
See application file for complete search history.

(56) References Cited

U.S. PATENT DOCUMENTS

| | | | | |
|---|---|---|---|---|
| 4,025,791 | A | 5/1977 | Lennington et al. | 250/341 |
| 4,121,102 | A | 10/1978 | Wilson | 250/341 |
| 4,207,468 | A | 6/1980 | Wilson | 250/341 |
| 4,398,172 | A | 8/1983 | Carroll et al. | 340/38 P |
| 4,492,111 | A | 1/1985 | Kirkland | 73/84 |
| 4,665,395 | A | 5/1987 | Van Ness | 340/825.31 |
| 4,870,419 | A | 9/1989 | Baldwin et al. | 342/50 |

(Continued)

FOREIGN PATENT DOCUMENTS

| | | |
|---|---|---|
| DE | 299 01 677 | 2/2003 |
| DE | 20 2004 004 446 U1 | 10/2004 |

(Continued)

OTHER PUBLICATIONS

*Hands-Free Actuation of Remote Controls*: Nerac Document No. (NDN) 085-00002-0080-9; author Unknown; published Apr. 23,2004.

(Continued)

*Primary Examiner* — Nam V Nguyen
(74) *Attorney, Agent, or Firm* — Renner Kenner Greive Bobak Taylor & Weber

(57) ABSTRACT

An operator system and related methods for automatically controlling access barriers which includes a base controller associated with at least one access barrier and at least one base receiver associated with the base controller. The system also includes at least one mobile transmitter that automatically and periodically generates at least one mobile signal detectable by the base receiver. The base controller selectively generates barrier movement commands upon receipt of the at least one mobile signal. Timers may be used to block receipt of any mobile signals for a period of time to prevent any further door movement. Such a system allows for hands-free operation of the access barrier. A discrete processing system may also be used to retrofit existing barrier operator systems for use in hands-free operation.

7 Claims, 15 Drawing Sheets

U.S. PATENT DOCUMENTS

| | | | | |
|---|---|---|---|---|
| 4,942,393 | A | 7/1990 | Waraksa et al. | 340/825.72 |
| 4,967,581 | A | 11/1990 | Ecrepont | 72/187 |
| 5,132,697 | A | 7/1992 | Tan | 343/718 |
| 5,164,732 | A | 11/1992 | Brockelsby et al. | 342/44 |
| 5,177,900 | A | 1/1993 | Solowiej | 49/363 |
| 5,192,954 | A | 3/1993 | Brockelsby et al. | 342/42 |
| 5,196,846 | A | 3/1993 | Brockelsby et al. | 340/933 |
| 5,235,633 | A | 8/1993 | Dennison et al. | 379/60 |
| 5,243,652 | A | 9/1993 | Teare et al. | 380/21 |
| 5,311,186 | A | 5/1994 | Utsu et al. | 342/51 |
| 5,319,364 | A | 6/1994 | Waraksa et al. | 340/825.72 |
| 5,379,033 | A | 1/1995 | Fujii et al. | 340/825.69 |
| 5,402,105 | A | 3/1995 | Doyle et al. | 340/539 |
| 5,406,275 | A | 4/1995 | Hassett et al. | 340/933 |
| 5,412,297 | A | 5/1995 | Clark et al. | 318/468 |
| 5,412,379 | A | 5/1995 | Waraksa et al. | 340/325.72 |
| 5,504,482 | A | 4/1996 | Schreder | 340/995 |
| 5,515,036 | A | 5/1996 | Waraksa et al. | 340/825.72 |
| 5,519,403 | A | 5/1996 | Bickley et al. | 342/352 |
| 5,559,520 | A | 9/1996 | Barzegar et al. | 342/357 |
| 5,596,840 | A | 1/1997 | Teich | 49/26 |
| 5,625,980 | A | 5/1997 | Teich et al. | 49/26 |
| 5,648,767 | A | 7/1997 | O'Connor et al. | 340/928 |
| 5,678,182 | A | 10/1997 | Miller et al. | 455/33.1 |
| 5,684,828 | A | 11/1997 | Bolan et al. | 375/238 |
| 5,686,902 | A | 11/1997 | Reis et al. | 340/825.54 |
| 5,689,269 | A | 11/1997 | Norris | 342/357 |
| 5,699,055 | A | 12/1997 | Dykema et al. | 340/825.22 |
| 5,798,681 | A * | 8/1998 | Chang | 336/83 |
| 5,831,533 | A | 11/1998 | Kanno | 340/573 |
| 5,894,267 | A * | 4/1999 | Blair | 340/545.1 |
| 5,903,226 | A | 5/1999 | Suman et al. | 340/825.69 |
| 5,929,769 | A | 7/1999 | Garnault | 340/825.31 |
| 5,940,007 | A | 8/1999 | Brinkmeyer et al. | 340/825.69 |
| 5,969,637 | A | 10/1999 | Doppelt et al. | 340/825.69 |
| 5,973,611 | A | 10/1999 | Kulha et al. | 340/825.31 |
| 5,990,828 | A | 11/1999 | King | 342/359 |
| 6,002,332 | A | 12/1999 | King | 340/545.1 |
| 6,011,468 | A | 1/2000 | Lee | 340/545.1 |
| 6,028,537 | A | 2/2000 | Suman et al. | 340/988 |
| 6,172,430 | B1 | 1/2001 | Schmitz et al. | 307/10.2 |
| 6,206,282 | B1 | 3/2001 | Hayes, Sr. et al. | 235/375 |
| 6,219,613 | B1 | 4/2001 | Terrier et al. | 701/207 |
| 6,229,988 | B1 | 5/2001 | Stapefeld et al. | 455/38.3 |
| 6,271,765 | B1 | 8/2001 | King et al. | 340/825.69 |
| 6,285,931 | B1 | 9/2001 | Hattori et al. | 701/29 |
| 6,294,981 | B1 | 9/2001 | Herrmannsdorfer et al. | 340/286.02 |
| 6,310,548 | B1 * | 10/2001 | Stephens et al. | 340/540 |
| 6,370,475 | B1 | 4/2002 | Breed et al. | 701/301 |
| 6,388,559 | B1 * | 5/2002 | Cohen | 340/5.71 |
| 6,400,956 | B1 | 6/2002 | Richton | 455/456 |
| 6,411,889 | B1 | 6/2002 | Mizunuma et al. | 701/117 |
| 6,415,439 | B1 | 7/2002 | Randell et al. | 725/153 |
| 6,429,768 | B1 | 8/2002 | Flick | 340/5.2 |
| 6,448,894 | B1 | 9/2002 | Desai | 340/505 |
| 6,476,732 | B1 | 11/2002 | Stephan | 340/988 |
| 6,512,466 | B2 | 1/2003 | Flick | 340/989 |
| 6,513,252 | B1 | 2/2003 | Schierbeek et al. | 33/356 |
| 6,535,143 | B1 | 3/2003 | Miyamoto et al. | 340/933 |
| 6,542,076 | B1 | 4/2003 | Joao | 340/539 |
| 6,559,775 | B1 | 5/2003 | King | 340/932.2 |
| 6,563,431 | B1 | 5/2003 | Miller, Jr. | 340/932.2 |
| 6,593,845 | B1 | 7/2003 | Friedman et al. | 340/10.33 |
| 6,593,856 | B1 * | 7/2003 | Madau | 340/12.27 |
| 6,597,291 | B2 * | 7/2003 | Tsui | 340/686.1 |
| 6,615,132 | B1 | 9/2003 | Nagasaka et al. | 701/200 |
| 6,616,034 | B2 | 9/2003 | Wu et al. | 235/375 |
| 6,624,605 | B1 | 9/2003 | Powder et al. | 318/445 |
| 6,634,408 | B2 | 10/2003 | Mays | 160/188 |
| 6,693,581 | B2 | 2/2004 | Gottwald et al. | 342/70 |
| 6,781,524 | B1 | 8/2004 | Clark et al. | 340/933 |
| 6,803,851 | B1 | 10/2004 | Kramer et al. | 340/5.61 |
| 6,867,686 | B1 | 3/2005 | Emmerling et al. | 340/10.2 |
| 6,883,579 | B2 | 4/2005 | Olmsted | 160/189 |
| 6,894,601 | B1 | 5/2005 | Grunden et al. | 340/10.41 |
| 6,911,898 | B2 | 6/2005 | Chung | 340/5.64 |
| 6,943,725 | B2 | 9/2005 | Gila et al. | 342/42 |
| 6,970,085 | B2 | 11/2005 | Okabe et al. | 340/545.6 |
| 6,980,117 | B1 | 12/2005 | Kirkland et al. | 340/686.1 |
| 7,027,773 | B1 | 4/2006 | McMillin | 455/41.2 |
| 7,068,181 | B2 | 6/2006 | Chuey | 340/825.69 |
| 7,071,813 | B2 * | 7/2006 | Fitzgibbon | 340/5.71 |
| 7,135,957 | B2 | 11/2006 | Wilson | 340/5.61 |
| 7,167,076 | B2 | 1/2007 | Wilson | 340/5.61 |
| 7,170,426 | B2 | 1/2007 | Tsui et al. | 340/988 |
| 7,194,412 | B2 | 3/2007 | Mays | 704/275 |
| 7,269,416 | B2 * | 9/2007 | Guthrie et al. | 455/420 |
| 7,289,014 | B2 | 10/2007 | Mullet et al. | 340/5.7 |
| 7,310,043 | B2 * | 12/2007 | Mamaloukas | 340/5.61 |
| 7,327,107 | B2 * | 2/2008 | Mullet et al. | 318/280 |
| 7,365,635 | B2 * | 4/2008 | Oberhauser | 340/5.71 |
| 7,418,800 | B1 * | 9/2008 | Sellman | 49/340 |
| 7,708,048 | B2 * | 5/2010 | Mays | 160/188 |
| 2001/0040514 | A1 | 11/2001 | Horber | 340/933 |
| 2003/0018478 | A1 | 1/2003 | Mays | 704/275 |
| 2003/0029579 | A1 | 2/2003 | Mays | 160/188 |
| 2003/0043021 | A1 | 3/2003 | Chung | 340/5.71 |
| 2003/0112121 | A1 | 6/2003 | Wilson | 340/5.61 |
| 2003/0142004 | A1 | 7/2003 | Gottwald et al. | 342/42 |
| 2004/0012483 | A1 | 1/2004 | Mays | 340/5.71 |
| 2004/0070516 | A1 | 4/2004 | Nielsen | 340/825.72 |
| 2004/0189511 | A1 | 9/2004 | Gila et al. | 342/42 |
| 2004/0239482 | A1 | 12/2004 | Fitzgibbon | 340/5.61 |
| 2005/0024229 | A1 | 2/2005 | Chuey | 340/825.72 |
| 2005/0057340 | A1 | 3/2005 | Fitzgibbon | 340/5.71 |
| 2005/0073425 | A1 | 4/2005 | Snell et al. | 340/686.6 |
| 2005/0134426 | A1 | 6/2005 | Mullet et al. | 340/5.7 |
| 2006/0038656 | A1 | 2/2006 | Wilson | 340/5.61 |

FOREIGN PATENT DOCUMENTS

| | | | |
|---|---|---|---|
| EP | 1 026 354 | A2 | 8/2000 |
| EP | 1 176 392 | A1 | 1/2002 |
| EP | 1 184 236 | | 3/2002 |
| EP | 1 298 955 | A1 | 4/2003 |
| WO | WO 99/63363 | | 12/1999 |
| WO | WO 2004/077729 | A2 | 9/2004 |
| WO | WO 2005/066442 | A1 | 7/2005 |

OTHER PUBLICATIONS

Office Action issued Sep. 25, 2006 in corresponding U.S. Appl. No. 11/211,297.

Response as filed Nov. 27, 2006 in corresponding U.S. Appl. No. 11/211,297.

Office Action issued Feb. 28, 2007 in corresponding U.S. Appl. No. 11/211,297.

Response as filed Jul. 30, 2007 in corresponding U.S. Appl. No. 11/211,297.

Notice of Allowance as issued Oct. 26, 2007 in corresponding U.S. Appl. No. 11/211,297.

Office Action issued Sep. 22, 2006 in corresponding U.S. Appl. No. 11/296,849.

Response as filed Nov. 27, 2006 in corresponding U.S. Appl. No. 11/296,849.

Office Action issued Feb. 26, 2007 in corresponding U.S. Appl. No. 11/296,849.

Response as filed Jul. 30, 2007 in corresponding U.S. Appl. No. 11/296,849.

Notice of Allowance issued Oct. 26, 2007 in corresponding U.S. Appl. No. 11/296,849.

Office Action issued Oct. 3, 2008 in corresponding U.S. Appl. No. 11/999,539.

Response as filed Jan. 26, 2009 in corresponding U.S. Appl. No. 11/999,539.

Notice of Allowance issued Nov. 6, 2009 in corresponding U.S. Appl. No. 11/999,539.

Office Action issued Jun. 20, 2011 in corresponding U.S. Appl. No. 12/077,303.

Office Action issued Mar. 25, 2011 in corresponding U.S. Appl. No. 12/908,085.

* cited by examiner

SYSTEM AND METHODS FOR AUTOMATICALLY MOVING ACCESS BARRIERS INITIATED BY MOBILE TRANSMITTER DEVICES

CROSS REFERENCE TO RELATED APPLICATION

This is a divisional application of application Ser. No. 11/211,297 filed Aug. 24, 2005, now U.S. Pat. No. 7,327,107, which is incorporated herein by reference.

TECHNICAL FIELD

Generally, the present invention relates to an access barrier control system, such as a garage door operator system for use on a closure member moveable relative to a fixed member and methods for programming and using the same. More particularly, the present invention relates to the use of a mobile transmitter maintained in a carrying device, such as an automobile, to initiate the opening and closing of an access barrier depending upon the position of the carrying device relative to the access barrier. Specifically, the present invention relates to a mobile transmitter that initiates communication with the garage door operator system and, in turn, movement of the barrier.

BACKGROUND ART

When constructing a home or a facility, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command input signals—for the purpose of opening and closing the door—from a wireless portable remote transmitter, from a wired or wireless wall station, from a keyless entry device or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency (RF) or infrared transmitter to actuate the motor and move the door in the desired direction. These remote devices allow for users to open and close garage doors without having to get out of their car. These remote devices may also be provided with additional features such as the ability to control multiple doors, lights associated with the doors, and other security features. As is well documented in the art, the remote devices and operators may be provided with encrypted codes that change after every operation cycle so as to make it virtually impossible to "steal" a code and use it at a later time for illegal purposes. An operation cycle may include opening and closing of the barrier, turning on and off a light that is connected to the operator and so on.

Although remote transmitters and like devices are convenient and work well, the remote transmitters sometimes become lost, misplaced or broken. In particular, the switch mechanism of the remote device typically becomes worn after a period of time and requires replacement. And although it is much easier to actuate the remote transmitter than for one to get out of an automobile and manually open the door or access barrier, it is believed that the transmitter and related systems can be further improved to obtain "hands-free" operation. Although there are some systems that utilize transponders for such a purpose, these systems still require the user to place an access card or similar device in close proximity to a reader. As with remote transmitters, the access cards sometimes become lost and/or misplaced. A further drawback of these access cards is that they do not allow for programmable functions to be utilized for different operator systems and as such do not provide an adequate level of convenience.

Another type of hands-free system utilizes a transponder, carried by an automobile, that communicates with the operator. The operator periodically sends out signals to the transponder carried in the automobile and when no return signal is received, the operator commands the door to close. Unfortunately, the door closing may be initiated with the user out of visual range of the door. This may lead to a safety problem inasmuch as the user believes that the door has closed, but where an obstruction may have caused the door to open and remain open thus allowing unauthorized access.

U.S. patent application Ser. No. 10/744,180, assigned to the assignee of the present application and incorporated herein by reference, addresses some of the shortcomings discussed above. However, the disclosed system does not provide specific auto-open and auto-close functionality in association with the vehicle's operational status. And the disclosed system does not provide for user-changeable sensitivity adjustments. Implementing a hands-free system that has universal settings for all home installations is extremely difficult. If one designs for optimum RF range, then the opening range of the barrier is improved, but in contrast, the closing range ends up being too high. If one does not design for optimum RF range then in worst case home installations, the opening RF range might not be sufficient. In other words, if the RF signal is too strong, the barrier opens at a distance relatively far away, but closes only out of sight of the user. Or, if the RF signal is too weak, then the user must wait for the barrier to open before entering the garage. Situations may also arise where a designated sensitivity level causes the operator to toggle between barrier opening and closing cycles before completion of a desired cycle.

U.S. patent application Ser. No. 10/962,224, assigned to the assignee of the present application and incorporated herein by reference, also addresses some of the shortcomings identified in the prior art. The '224 application discloses a specific embodiment wherein the mobile transponder is directly connected to the ignition system and power source of the carrying device. However, such an embodiment requires a specialized installation and does not permit easy transfer of the transponder between carrying devices. And the known hands-free devices all require periodic transmission of a radio frequency signal from the garage door operator. It is believed that this may lead to increased electrical "noise" pollution which adversely affects nearby electrical communication devices.

Therefore, there is a need in the art for a system that automatically moves access barriers depending upon the proximity of a device carrying a remote mobile transmitter, wherein the transmitter automatically emits somewhat periodic signals that are received by the operator which then moves the barrier and ignores subsequent transmitter signals for a predetermined period of time. And there is a need for the remote mobile transmitter to also consider the operational status of the carrying device by use of a sensor that may or may not be directly connected to the carrying device's electrical system. And there is a need for a user-changeable sensitivity adjustment for the mobile transmitter.

DISCLOSURE OF THE INVENTION

One of the aspects of the present invention, which shall become apparent as the detailed description proceeds, is attained by a system and methods for automatically moving access barriers initiated by mobile transmitter devices.

Another aspect of the present invention is attained by an automated actuation system which changes states based upon a position of an actuating device, the system comprising a base controller associated with the actuation system, the base controller adapted to receive at least one automatically generated signal, the actuation system having at least two conditions and at least one mobile transmitter automatically and periodically generating at least one mobile signal receivable by the base controller, the base controller changing the actuation system between a first condition and a second condition based upon whether the mobile signal is received or not.

Still another aspect of the present invention is attained by an operator system for automatically controlling access barriers, comprising a base controller associated with at least one access barrier, at least one base receiver associated with the base controller, and at least one mobile transmitter automatically and periodically generating at least one mobile signal detectable by the at least one base receiver, the base controller selectively generating barrier movement commands depending upon whether the at least one mobile signal is received.

Yet another aspect of the present invention is attained by a discrete add-on processing system adapted to be connected to a barrier operating system which moves a barrier between open and closed positions, the processing system comprising at least one mobile transmitter automatically and periodically generating at least one mobile signal, a barrier position indicator generating a barrier position signal, and an add-on controller adapted to be connected to the barrier operating system, the add-on controller receiving at least one mobile signal and the barrier position signal so as to enable the barrier operating system to move the barrier based upon whether the at least one mobile signal is received or not.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
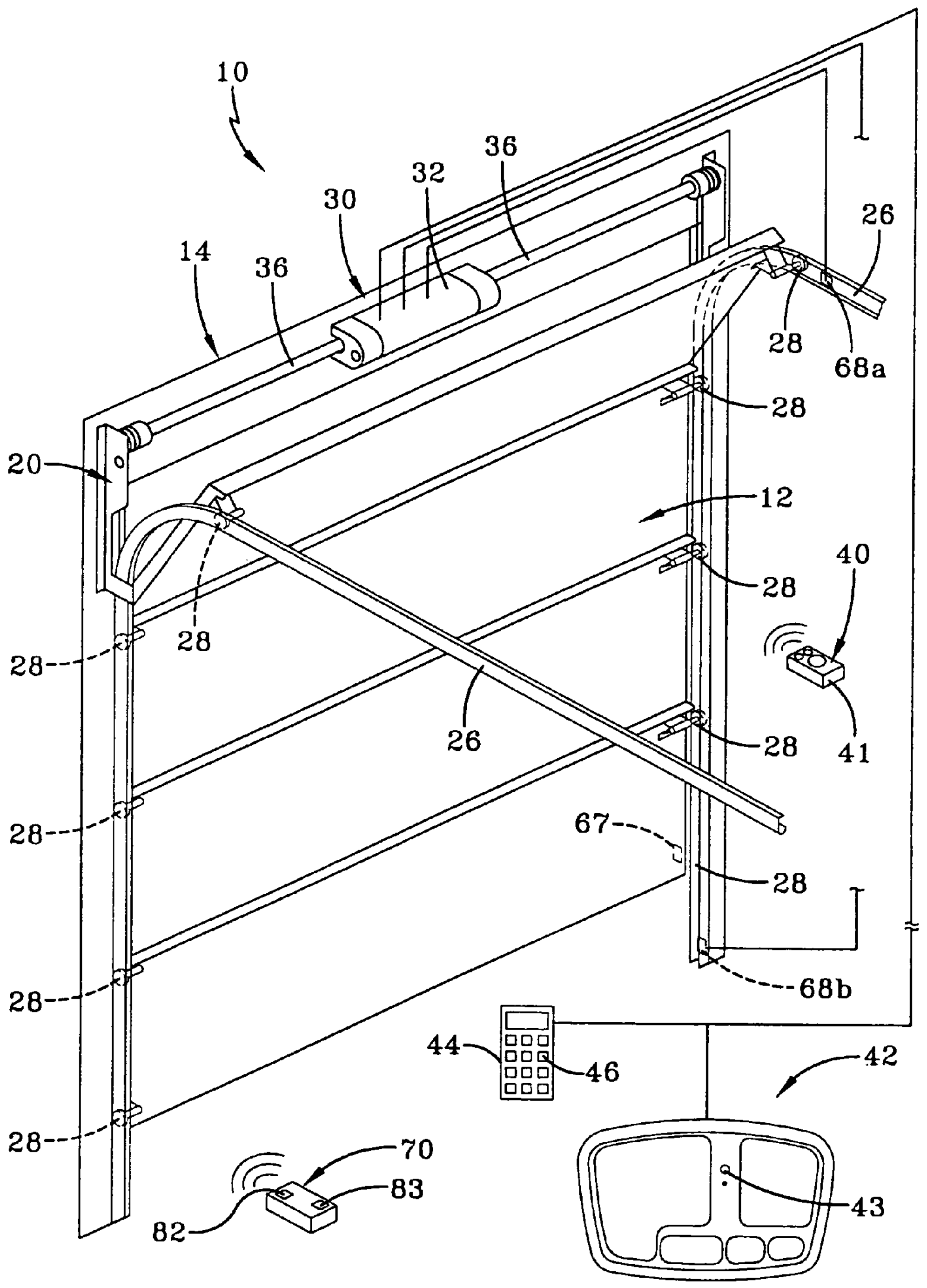
FIG. 1 is a perspective view depicting a sectional garage door and showing an operating mechanism embodying the concepts of the present invention.

A system, such as a garage door operator system which incorporates the concepts of the present invention, is generally designated by the numeral 10 in FIG. 1. Although the present discussion is specifically related to an access barrier such as a garage door, it will be appreciated that the teachings of the present invention are applicable to other types of barriers. The teachings of the invention are equally applicable to other types of movable barriers such as single panel doors, gates, windows, retractable overhangs and any device that at least partially encloses or restricts access to an area. Moreover, the teachings of the present invention are applicable to locks or an automated control of any device based upon an operational status, position, or change in position of a proximity or triggering device. Indeed, it is envisioned that the present teachings could be used as a remote keyless entry for automobiles, houses, buildings and the like. The disclosed system could be used in any scenario where an object (such as a garage door controlled by an operator) changes state or condition (open/close, on/off, etc.) based upon a position (away/docked) or change in position (approaching/leaving) of a second object, such as a mobile transmitter, with respect to the first object.

The discussion of the system 10 is presented in three subject matter areas: the operator; the hands-free mobile transmitter; and operation of the mobile transmitter with the operator. The discussion of the operator presents aspects commonly found in a garage door operator and which enable features provided by the mobile transmitter. The structural aspects of the mobile transmitter include a discussion of an encryption technique utilized thereby; use of an activity and/or an ignition sensor by the transmitter; and the setting of sensitivity levels and the ability of the mobile transmitter to be actuated manually. Finally, the discussion of the operation of the mobile transmitter and the operator provides two different operational scenarios. The first scenario relates to the use of dual transmitter signals; and the second scenario is where the mobile transmitter uses signal strengths.

I. Operator

The system 10 may be employed in conjunction with a conventional sectional garage door generally indicated by the numeral 12. The opening in which the door is positioned for opening and closing movements relative thereto is surrounded by a frame generally indicated by the numeral 14. A track 26 extends from each side of the door frame and receives a roller 28 which extends from the top edge of each door section. A counterbalancing system generally indicated by the numeral 30 may be employed to balance the weight of the garage door 12 when moving between open and close positions or conditions. One example of a counterbalancing system is disclosed in U.S. Pat. No. 5,419,010, which is incorporated herein by reference.

Figure 2:
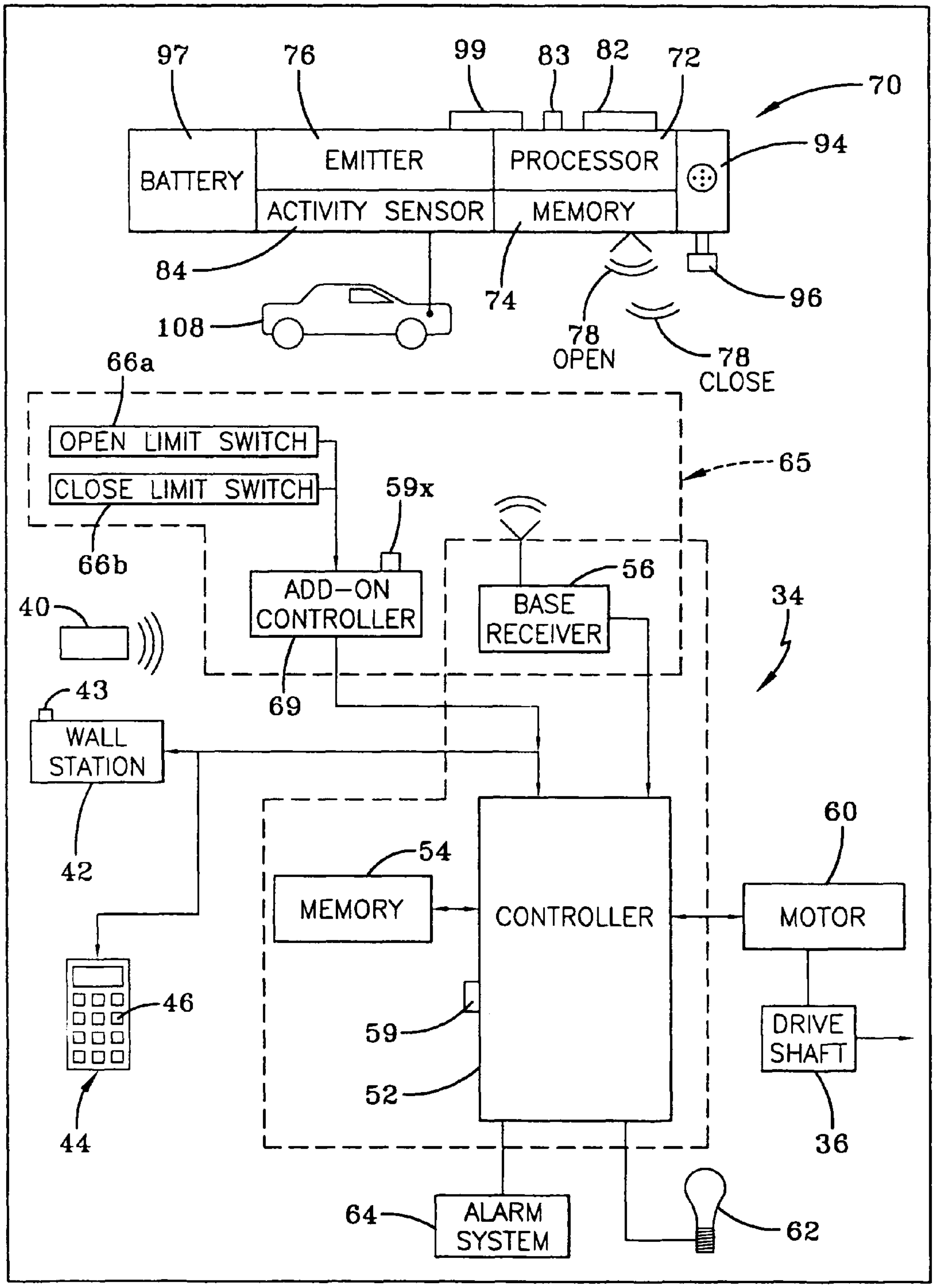
FIG. 2 is a block diagram of an operator system with a hands free mobile remote transmitter according to the present invention.

An operator housing 32, which is affixed to the frame 14, carries a base operator 34 seen in FIG. 2. Extending through the operator housing 32 is a drive shaft 36 which is coupled to the door by cables or other commonly known linkage mechanisms. Although a header-mounted operator is disclosed, the control features to be discussed are equally applicable to other types of operators used with movable barriers. For example, the control routines can be easily incorporated into trolley type, screwdrive and jackshaft operators used to move garage doors or other types of access barriers. In any event, the drive shaft 36 transmits the necessary mechanical power to transfer the garage door 12 between closed and open positions. In the housing 32, the drive shaft 36 is coupled to a drive gear wherein the drive gear is coupled to a motor in a manner well known in the art. The control features disclosed are also applicable to any type of actuation system which changes states or condition (open/close, on/off, etc.) based upon a position of an actuation device (docked/away, approaching/leaving, etc.) with respect to the actuation system.

Briefly, the base operator 34 may be controlled by a wireless remote transmitter 40, which has a housing 41, or a wall station control 42 that is wired directly to the system 10 or which may communicate via radio frequency or infrared signals. The remote transmitter 40 requires actuation of a button to initiate movement of the barrier between positions. The wall station control 42 is likely to have additional operational features not present in the remote transmitter 40. The wall station control 42 is carried by a housing which has a plurality of buttons thereon. Each of the buttons, upon actuation, provide a particular command to the controller to initiate activity such as the opening/closing of the barrier, turning lights on and off and the like. A program button 43, which is likely recessed and preferably actuated only with a special tool, allows for programming of the base operator 34 for association with remote transmitters and more importantly with a hands-free mobile transmitter as will become apparent as the description proceeds. The system 10 may also be controlled by a keyless alphanumeric device 44. The device 44 includes a plurality of keys 46 with alphanumeric indicia thereon and may have a display. Actuating the keys 46 in a predetermined sequence allows for actuation of the system 30. At the least, the devices 40, 42 and 44 are able to initiate opening and closing movements of the door coupled to the system 30. The base operator 34 monitors operation of the motor and various other connected elements. Indeed, the operator may even know the state, condition or position of the door, and the previous operational movement of the door. A power source is used to energize the components of the system 10 in a manner well known in the art.

The base operator 34 includes a controller 52 which incorporates the necessary software, hardware and memory storage devices for controlling the operation of the overall system and for implementing the various advantages of the present invention. It will be appreciated that the implementation of the present invention may be accomplished with a discrete processing device that communicates with an existing base operator. This would allow the inventive aspects to be retrofit to existing operator systems. In electrical communication with the controller 52 is a non-volatile memory storage device 54, also referred to as flash memory, for permanently storing information utilized by the controller in conjunction with the operation of the base operator. The memory device 54 may maintain identification codes, state variables, count values, timers, door status and the like to enable operation of the mobile transmitter. Infrared and/or radio frequency signals generated by transmitters 40, 42, 44 and the mobile transmitter are received by a base receiver 56 which transfers the received information to a decoder contained within the controller. Those skilled in the art will appreciate that the receiver 56 may be replaced with a transceiver which would allow the operator controller to relay or generate command/status signals to other devices associated with the operator system 10. The controller 52 converts the received radio frequency signals or other types of wireless signals into a usable format. It will be appreciated that an appropriate antenna is utilized by the receiver 56 for receiving the desired radio frequency or infrared beacon signals from the various wireless transmitters. The controller 52 is a Model MSP430F1232 supplied by Texas Instruments. Of course equivalent receivers and controllers could be utilized.

The base receiver is directly associated with the base operator 34, or in the alternative, the base receiver could be a stand-alone device. The receiver 56 receives signals in a frequency range centered about 372 MHz generated by the transmitter. The base receiver may also receive signals in a frequency range of 900 to 950 MHZ. And the receiver may be adapted to receive both ranges of frequencies. Indeed, one frequency range may be designated for only receiving door move signals from a transmitter, while the other frequency range receives identification type signals used to determine position or travel direction of a mobile transmitter relative to the base receiver, and also door move signals.

The controller 52 is capable of directly receiving transmission type signals from a direct wire source as evidenced by the direct connection to the wall station 42. And the keyless device 44, which may also be wireless, is also connected to the controller 52. Any number of remote transmitters 40*a-x* can transmit a signal that is received by the base receiver 56 and further processed by the controller 52 as needed. Likewise, there can be any number of wall stations. If an input signal is received from a remote transmitter 40, the wall station control 42, or a keyless device 44 and found to be acceptable, the controller 52 generates the appropriate electrical input signals for energizing the motor 60 which in turn rotates the drive shaft 36 and opens and/or closes the access barrier. A learn button 59 may also be associated with the controller, wherein actuation of the learn button allows the controller to learn any of the different types of transmitters used in the system 10.

A light 62 is connected to the controller 52 and may be programmed to turn on and off depending upon the conditions of the mobile transmitter and how it is associated with the controller 52. Likewise, an alarm system 64 may be activated and/or deactivated depending upon the position of the mobile transmitter 70 with respect to the base transceiver 56.

A discrete add-on processing device is designated generally by the numeral 65 and is primarily shown in FIG. 2, although other components of the device are also shown in FIG. 1. The device 65 may be employed to modify already installed base operators that control barrier movement, wherein the existing units may or may not have an existing receiver. In any event, the device 65 includes an open limit switch 66*a* and a close limit switch 66*b*, each of which detects when the barrier or door 12 is in a corresponding position. This may be done in most any manner, and in this embodiment a magnet 67 is secured to a leading or trailing edge, or adjacent side surface of the door. In one embodiment, the magnet is attached to a lower portion of the lowermost sectional door panel in a position proximal one of the tracks 26. At least a pair of inductive sensors 68 are positioned in the track 26 proximal the magnet 67 so as to form the respective limit switches 66*a* and 66*b*. Accordingly, when the magnet 67 is proximal a sensor 68 located in the track, an appropriate signal is generated. The signals, when generated, indicate when the door is in an open position or a closed position. Of course, other types of sensor arrangements, such as tilt switches, positional potentiometers and the like, could be used to indicate the positional or operational status of the door.

An add-on controller 69 is included in the device 65 and includes the necessary hardware, software and memory needed to implement this variation of the invention. The memory maintained by the controller may include buffers for storing a number of received signals. If needed, the base receiver 56 may be incorporated into the device 65 and operate as described above, except that the signals received are sent to the add-on controller 69. The add-on controller 69 may provide a learn button 59*x* that allows transmitters to be associated therewith in a manner similar to that used by the controller 52.

The add-on controller 69 receives input signals from at least the limit switches 66. The add-on controller 69 may also receive input from the receiver 56 if an appropriate receiver is not already provided with the existing base operator 34. In any event, based upon input received, the add-on controller generates signals received by the controller 52 to initiate opening and closing movements in manners that will be described.

II. Mobile Transmitter

A mobile transmitter 70, which may also be referred to as a hands-free transmitter or a proximity device, is included in the system 10 and effectively operates in much the same manner as the other wireless transmitters except direct manual input from the user is not required, although manual input could be provided. As will be discussed in detail, the transmitter 70 (the actuation device) initiates door movement or a change in condition of an actuation system depending upon its proximity to the controller, the transmitter's direction of travel with respect to the controller and/or the operational status of the device that is carrying the transmitter. The transmitter 70 includes a processor 72 connected to a non-volatile memory storage device 74. As will be discussed in further detail, the memory may maintain system mobile state variables, count values, timer values, signal counts and the like which are utilized to enable operation of the overall system.

The mobile transmitter 70 includes an emitter 76 that is capable of generating a mobile signal 78 on a periodic or a staggered basis. The generation of the mobile signals 78 and the information or format of the emitted signal may be changed depending upon a detected operational status of the carrying device. Indeed, the mobile signal 78 may be multiple signals, each of which initiates different processing by the controller 52. The processor 72 includes the necessary hardware, software and memory for generating signals to carry out the invention. The processor 72 and the memory 74 facilitate generation of the appropriate information to include in the mobile signal 78 inasmuch as one remote mobile transmitter may be associated with several operators or in the event several remote mobile transmitters are associated with a single operator. In other words, the base controller is able to distinguish the mobile signals of different transmitters and act upon them accordingly. The system will most likely be configured so that any door move commands generated by the mobile transmitter can be overridden by any commands received from the wall station transmitter.

The mobile transmitter 70 includes a learn/door move button 82 and a sensitivity/cancel button 83 which allows for override commands and/or programming of the mobile transmitter with respect to the controller 52. Generally, the mobile transmitter 70 allows for "hands-free" operation of the access barrier. In other words, the mobile transmitter 70 may simply be placed in a glove compartment or console of an automobile or other carrying device and communicate with the controller 52 for the purpose of opening and closing the access barrier depending upon the position of the mobile transmitter 70 with respect to the base receiver 56. As such, after the mobile transmitter and the base operator 34 are learned to one another, the user is no longer required to press a door move button or otherwise locate the mobile or remote transmitter before having the garage door open and close as the carrying device approaches or leaves the garage. If needed, manual actuation of the button 82, after programming, may be used to override normal operation of the proximity device so as to allow for opening and closing of the barrier and also to perform other use and/or programming functions associated with the operator system 34. Actuation of the button 83, after programming, provides for temporary disablement of the hands-free features.

The transmitter 70 may utilize an activity-type sensor 84 which detects some type of observable phenomenon such as vibration of the carrying device when energized or detection of electric emissions generated by the vehicle's spark plugs. In the alternative, the mobile transmitter 70 may be connected directly to an engine sensor, such as an accessory switch, of the automobile. The engine sensor, as with the other activity-type sensors, determines the operational status of the carrying device which causes the mobile transmitter to generate mobile signals which, in turn, initiate barrier movement.

Additional features that may be included with the proximity mobile transmitter 70 are an audio source 94 and a light source 96. It is envisioned that the audio source 94 and/or the light source 96 may be employed to provide verbal instructions/confirmation or light indications as to certain situations that need the immediate attention of the person utilizing the mobile transmitter 70. The sources 94 and 96 may also provide confirmation or rejection of the attempted programming steps to be discussed later. All of the components contained with the mobile transmitter 70 may be powered by a battery used by the carrying device or at least one battery 97 which ideally has a minimum two year battery life. If desired, the battery 97 may be of a rechargeable type that is connectable to a power outlet provided by the carrying device. In this case, use of a long-life or rechargeable battery eliminates the need for the activity sensor 84 or direct connection to the accessory switch.

In normal operation, the mobile transmitter 70 will always be on. And the transmitter 70 may be disabled by actuating both buttons for a predetermined period of time. In the alternative, a slide switch 99, which is ideally recessed in the transmitter housing, can be used to quickly enable or disable the transmitter 70. The switch 99 is connected to the processor 72, and upon movement of the switch to a disable position, a cancel command is automatically generated prior to powering down. This is done so that the base controller will not assume that the power down is some other type of signal such as loss of a close signal.

Figure 3:
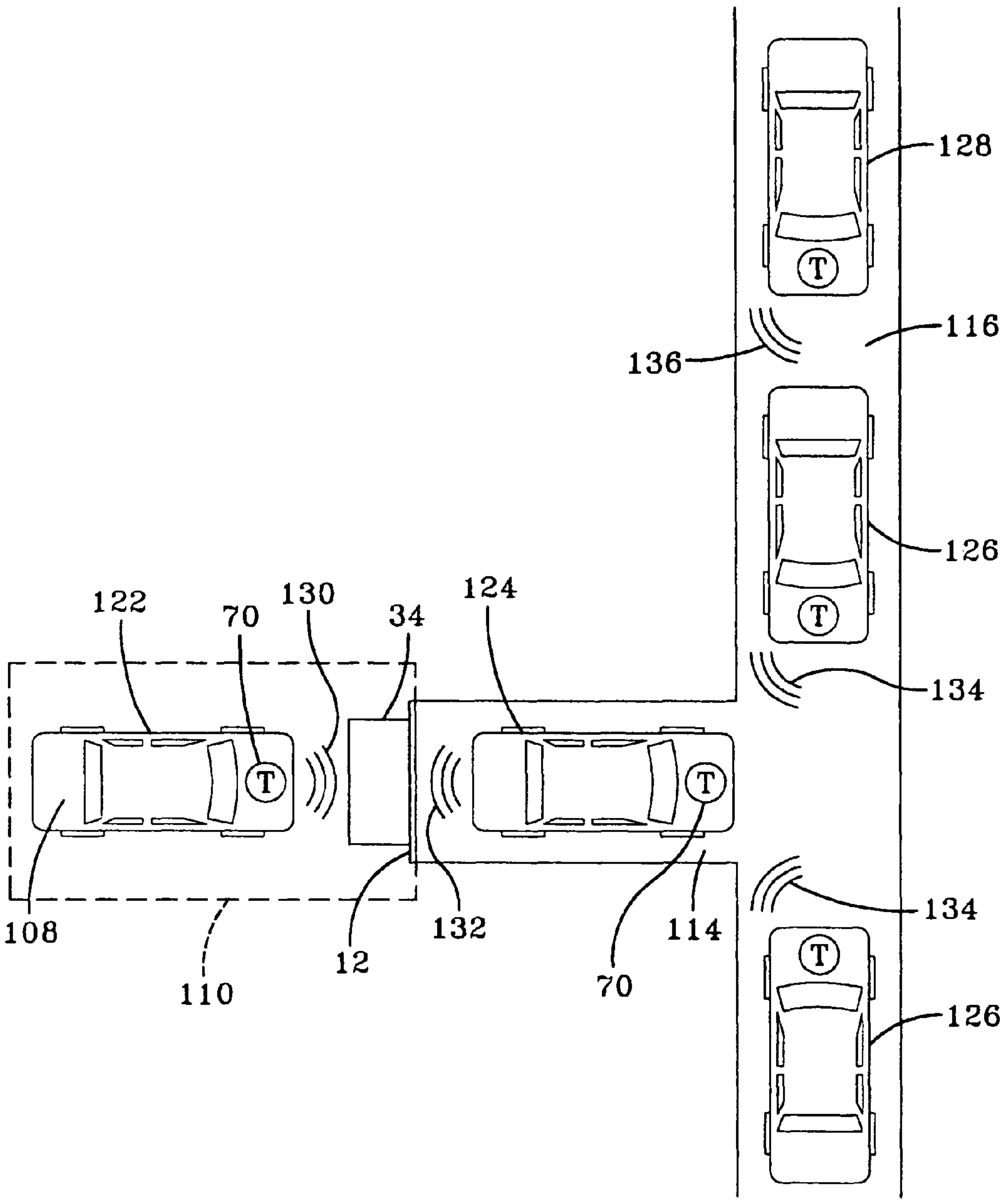
FIG. 3 is a schematic diagram of various positions of an exemplary carrying device with respect to an access barrier that utilizes the operator system according to the present invention.

Referring now to FIG. 3, a schematic diagram showing the relationship between a carrying device 108 that carries the mobile transmitter in its various positions and the operator system 34 is shown. Typically, the carrying device is an automobile maintained in a garage or other enclosure generally indicated by the numeral 110. The enclosure 110 is separated from it's outer environs by the access barrier 12 which is controlled by the operator system 34 in the manner previously described. The enclosure 110 is accessible by a driveway 114 which is contiguous with a street 116 or other access-type road.

The carrying device 108 is positionable in the enclosure 110 or anywhere along the length of the driveway 114 and the street 116. The carrying device may be in either a "docked" state inside the enclosure 110 or in an "away" state anywhere outside the enclosure. In some instances, the "away" state may further be defined as a condition when the signals generated by the mobile transmitter 70 are no longer receivable by the base operator 34. As the description proceeds, other operational or transitional states of the transmitter 70 may be discussed. As will become apparent, the transmitter 70 initiates one-way communications with the base controller.

The transmitter 70 may generate signals at different power levels which are detected by the controller, or the transmitter may generate a single power level signal and the controller determines and compares signal strength values for successive mobile signals. In any event, to assist in understanding the states and the power thresholds, specific reference to positions of the carrying device with respect to the enclosure are provided. In particular, it is envisioned that a docked state 122 is for when the automobile or other carrying device is positioned within, or in some instances just outside, the enclosure 110. An action position 124 designates when the carrying device 108 is immediately adjacent the barrier 12, but outside the enclosure and wherein action or movement of the barrier 12 is likely desired. An energization position 126, which is somewhat removed from the action position 124, designates when an early communication link between the transponder 76 and the receiver 56 needs to be established in preparation for moving the barrier 12 from an open to a closed position or from a closed position to an open position. Further from the energization position(s) 126 is an away position 128 for those positions where energization or any type of activation signal generated by the emitter and received by the operator system is not recognized until the energization position(s) 126 is obtained. Indeed, entry into the Away position may be recognized by the base controller and result in initiation of barrier movement.

A. Encryption

It will be appreciated that the mobile signals generated by the mobile transmitter 70 may be encrypted. An exemplary algorithm should be fairly simple and small so as not to use all the resources of the processor. Different size bit keys could be used depending upon the desired level of security. The serial number of the transmitting unit will be encrypted using an open source algorithm. Each transmitter is provided with a unique serial number by the manufacturer or the installer. Each base controller is formatted to accept and learn a predesignated range of serial numbers and has software to decrypt a data transmission which includes the encrypted serial number. Added security may be provided by adding a counter or other changing data that changes on every transmission by a predetermined pattern. The changing counter may be a 16-bit number that changes on every transmission according to a predetermined pattern (simple incrementing or it could be a more complex pattern). The base will know how the counter changes and it will receive this message and it will require receipt of a second message with a new counter value that changed according to the predetermined pattern. This prevents any hostile device that emulates the transmitted message and reproduces the exact same message. The base will know that the message is not from a safe source if the counter does not change accordingly.

The base receiver receives the first transmission but will then expect a second transmission with an expected change in the counter data. It will accept the command only if the counter data changes to the expected value. If the data the receiver receives does not have a changing counter, then the receiver could discard the command and assume it is from a hostile source. The key for the encryption routine will be split into two parts. Part of the key will be a static number known to both the mobile and the base, and part of the key will be derived from the counter value. This will help prevent any hostile device that receives the message from having access to sensitive data such as the serial number. The transmitter will transmit the sensitive data encrypted and the counter in the open in the following manner:

| Transmitted Data | | | |
|---|---|---|---|
| Header | Counter | Encrypted Serial Number | Other non-encrypted Data |

The receiver will use the same static key to decrypt the sensitive data. It will check the counter to make sure it is at the expected value. If both the key decrypts the data properly and the counter validates correctly, only then will the receiver accept the command or signal transmitted. Use of such an encryption algorithm facilitates use of the mobile transmitter with the operator system.

B. Activity/Ignition Sensors

In FIGS. 4-7 various types of sensors utilized in conjunction with the mobile transmitter device and their operation are shown. As will be discussed, the mobile transmitter utilizes an activity sensor to determine when the carrying device is active. In particular, the vibration sensor or electrical noise sensor detects some phenomenon generated by the carrying device to indicate that it is in an operative condition. The ignition sensor—described in regard to FIG. 7—is directly connected to the electrical operating system of the carrying device and also provides an indication as to its operating state. As will become apparent, the activity sensor enables auto-open and/or auto-close operational features.

Figure 4:
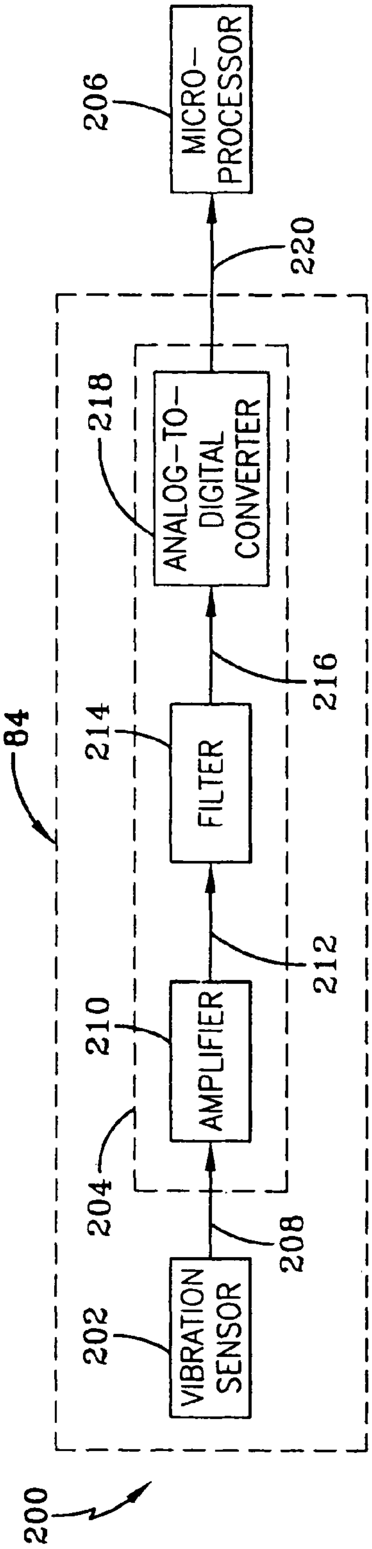
FIG. 4 is a schematic diagram of an activity sensor in the form of a vibration sensor incorporated into the mobile remote transmitter utilized with the operator system according to the prevent invention.

Referring now to FIG. 4, an exemplary detection circuit incorporated into the activity sensor 84 is designated generally by the numeral 200. Generally, after determining whether the carrying device is active, the circuit 200 notifies the processor 72 of the mobile transmitter whether to "Wake Up" or "Go to Sleep." Thus, the circuit 200 allows a user to go a longer time without changing or re-charging the batteries of the mobile transmitter. Alternatively, this circuit 200 may allow manufacturers to place smaller batteries in mobile transmitters while still offering users an equivalent battery life.

The detection circuit 200 has three components; a vibration sensor 202, a format circuit 204, and a microprocessor 206. The vibration sensor 202 detects vibrations of the vehicle or carrying device in which the mobile transmitter 70 is located. If placed properly, the vibration sensor 202 determines whether a vehicle's motor is active, even if the motor is merely idling. The vibration sensor 202 may be any element capable of detecting vibration. For example, in one particular embodiment the vibration sensor 202 may be a ceramic piezoelectric element. The vibration sensor 202 generates a vibration signal 208. In some embodiments, this vibration signal 208 will be an analog signal. In other embodiments, the vibration sensor 202 may include an analog-to-digital converter and the vibration signal 208 will be a digital signal. In any event, the vibration signal 208 is received and formatted by the format circuit 204 which prepares the vibration signal 208 for the microprocessor 206. The format circuit 204 receives the vibration signal 208 which may include an amplifier 210. If present, the amplifier 210 could be an op amp, a bipolar junction transistor amplifier, or another circuit that sufficiently amplifies the vibration signal. The amplifier 210 generates an amplified signal 212.

The format circuit 204 may also include a filter 214. The filter 214 accepts an input signal which may either be the vibration signal 208, or alternatively (if the amplifier 210 is present), the amplified signal 212. In any event, the filter 214 removes unwanted frequencies from the input signal and converts the input signal into a filtered signal 216. Note that the format circuit 204 may include embodiments where the amplifier 210 and filter 214 are transposed.

The format circuit 204 includes an analog-to-digital converter 210 which accepts an analog input signal. This analog input signal may be the vibration signal 208, the amplified signal 212, or the filtered signal 216, depending on the components present in the system. In any event, the analog-to-digital converter 218 converts the analog input signal into a digital signal 220. This digital signal 220 is then received by the microprocessor 206 which may be the same as the processor 72 or otherwise linked thereto. In any event, either or both processors provide the necessary hardware and software to enable operation of the sensor and the system 10. The microprocessor 206 evaluates the digital signal 220 to determine whether the vehicle 108 is active or not. It will be appreciated that the analog-to-digital converter 218 may be either internal or external to the microprocessor 72/206.

Figure 5:
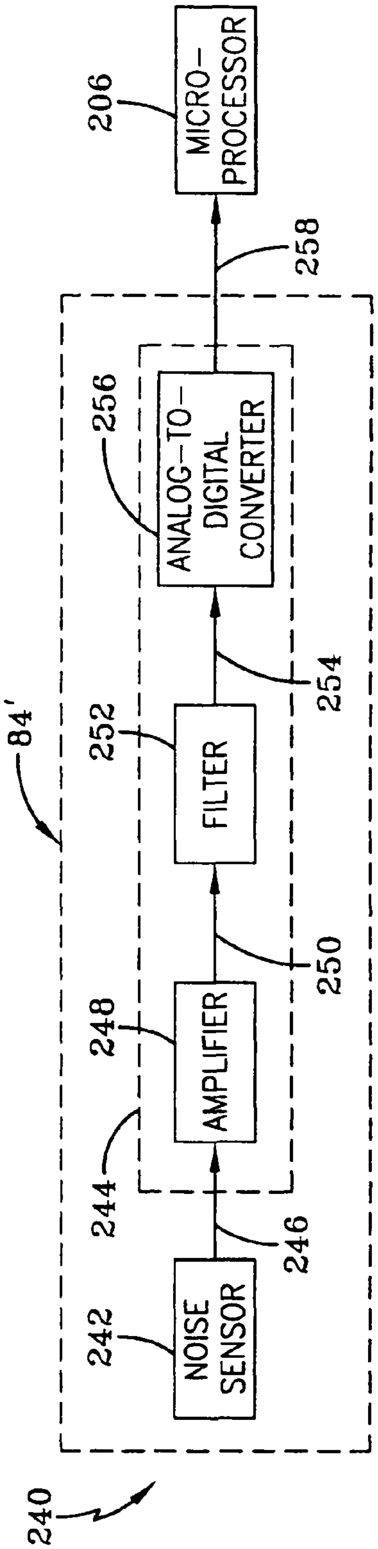
FIG. 5 is a schematic diagram of an activity sensor in the form of an electrical noise sensor incorporated into the mobile remote transmitter, utilized with the operator system according to the present invention.

Another embodiment of the present invention may utilize an activity sensor designated generally by the numeral 84' in FIG. 5 to aid in low-power usage. In such an embodiment, a detection circuit 240 detects whether a vehicle or carrying device is active or not and includes a noise signal sensor 242, a format circuit 244, and the microprocessor 72/206 which has the same features as in the other sensor embodiment.

The noise sensor 242 detects electromagnetic waves and generates a noise signal 246. The sensor 242 could be an antenna with a simple coil of wire, a long rod, or the like. In understanding how the noise sensor works, it is useful to note that an automobile engine emits a noise signature when it is active. When the engine is not active, it does not emit the same noise signature if at all. For example, the noise sensor 242 may be an amplitude modulation (AM) detector. In other embodiments, the noise sensor 242 can detect a wide bandwidth noise signature from the electric emissions of spark plugs. Spark plugs normally have a repetition rate of around 70 to 210 Hz and about a 25 KV peak volt signal with a rise time in the microsecond range. In any event, the generated noise signal 246 is received by the format circuit 244 which prepares the noise signal 246 for receipt by the microprocessor 72/206. In one embodiment, the noise signal may be received by an amplifier 248. If present, the amplifier 248 may be an op amp, a bipolar junction transistor amplifier, or another circuit that sufficiently amplifies the noise signal 246 and generates an amplified signal 250.

As with the amplifier 248, the format circuit 244 may have another optional component such as a filter 252 which accepts an input signal. This input signal may be the noise signal 246, or alternatively (if the amplifier 248 is present), the amplified signal 250. In any event, the filter 252 removes unwanted frequencies or irrelevant noise from the input signal and generates a filtered signal 254. It will be appreciated that the amplifier 248 and the filter 252 may be transposed in the format circuit 244.

An analog-to-digital converter 256 receives an analog input signal. The analog input signal may be the noise signal 246, the amplified signal 250, or the filtered signal 254 depending on which components are present in the system. In any event, the analog-to-digital converter 256 converts the analog input signal into a digital signal 258 which is received by the microprocessor 72/206. The microprocessor 72/206 evaluates the digital signal 258 and determines whether the vehicle 108 is active or not. It will be appreciated that the analog-to-digital converter 256 may be either internal or external to the microprocessor 72/206.

Figure 6:
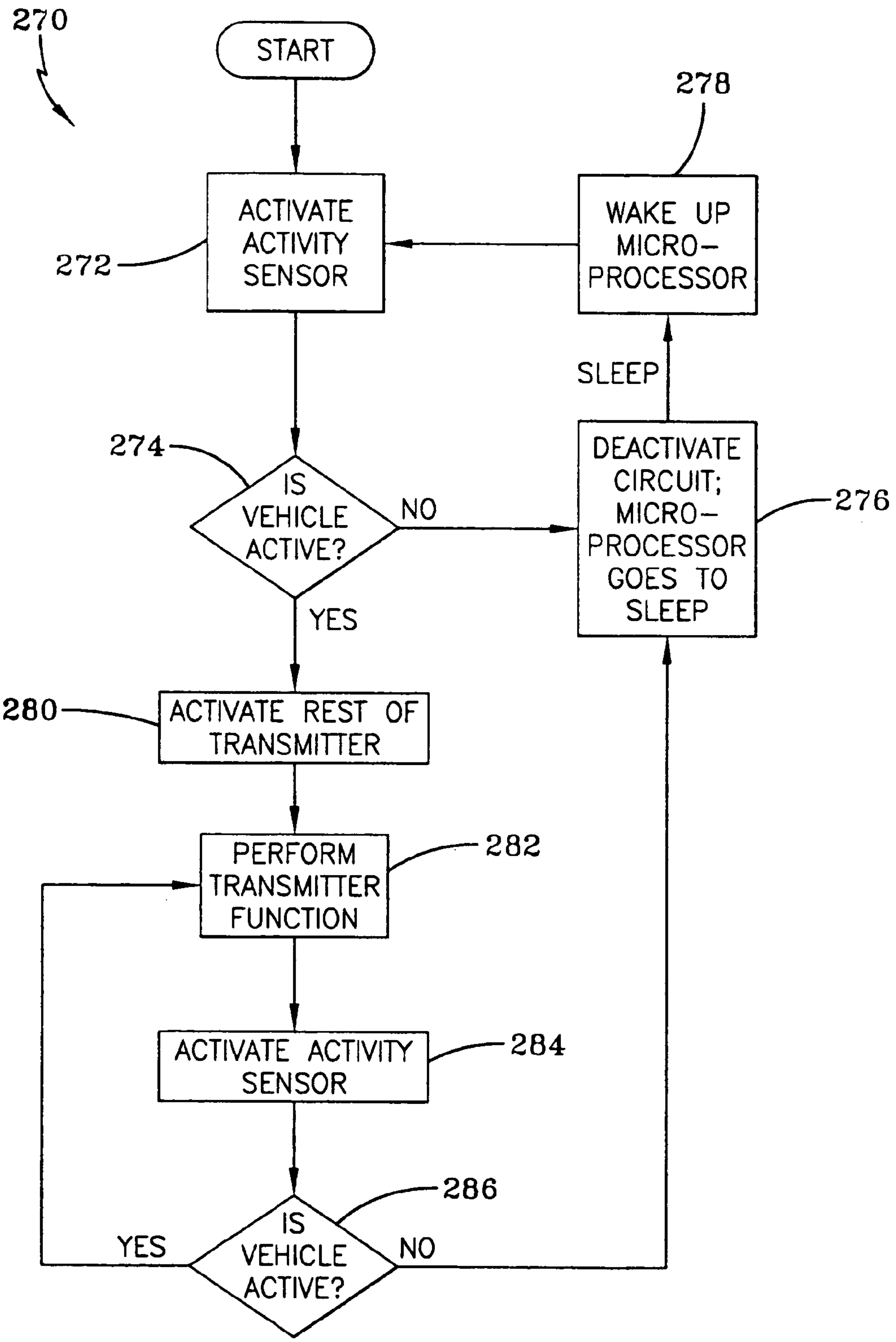
FIG. 6 is an operational flow chart for either of the activity sensors shown and described in FIGS. 4 and 5 to minimize power usage of the mobile remote transmitter.

Referring now to FIG. 6, the process steps for operation of the activity sensor 84/84' are illustrated in the flow chart designated generally by the numeral 270. As shown, the activity sensor 84/84' is first activated at step 272. As will be discussed in more detail as the description proceeds, the mobile transmitter 70 is learned to the base operator 34 and various variables and attributes are set internally to enable operation of the system 10. As part of the overall operation, the activity sensor 84/84' is utilized in such a manner that if the carrying device is determined to be in an "on" condition, then the transmitter 70 automatically generates the mobile signal at a specified rate, such as anywhere from one to 60 times per second. However, if the detection circuit determines that the carrying device is "off," then the transmitter is placed in a sleep mode so as to conserve battery power and the mobile signal is generated at a significantly reduced rate such as once every ten seconds, if at all.

In particular, at step 274, the microprocessor 206/72 queries the sensor 84/84' and determines if the vehicle is active or not. In making this determination, the microprocessor evaluates a changing voltage level or a predetermined voltage level according to a programmed detection protocol.

If the vehicle is not active, the microprocessor 206/72 "sleeps" and the rest of the circuit (including the activity sensor and RF transmitter) is deactivated at step 276. Next, the microprocessor periodically wakes up at step 278. This periodic awakening can be accomplished, for example, by programming a watchdog timer or other peripheral to wake up the microprocessor at specified intervals. If the sleep interval is relatively long for the sensor and related circuitry, then the circuit uses relatively little power. After the microprocessor is awakened, the activity sensor is energized again at step 272 and the microprocessor again queries whether the vehicle is active at step 274.

If the vehicle is determined to be active, then the microprocessor activates the mobile transmitter at step 280. Next, the transmitter performs the functions to be described at step 282. As will be described, these functions may include at least transmitting an RF signal to the base receiver 56. In any event, after the transmitter performs its function, the microprocessor again activates the sensor at step 284 and queries the sensor to determine if the vehicle is still active or not at step 286. If the vehicle is still active, the microprocessor again performs the transmitter function at step 282. If the vehicle is not active, the process returns to step 276 where the microprocessor deactivates the activity sensor and the rest of the transmitter, and then goes back to sleep.

Optimally, one would want to use a low power microprocessor to maximize the power management of a battery-powered device. Microprocessors enter the sleep mode and are periodically awakened by a watchdog time or other peripheral. While the microprocessor is in sleep mode, it may draw a current of merely a few micro-amps. If one wants to be even more efficient, one could add a switch to the vibration sensor and amplifier to switch off that part of the circuit to minimize current draw during sleep time of the microprocessor. As can be readily seen from this discussion, a long sleep period for the system results in extended battery life.

Those skilled in the art will appreciate that the sensor circuit could be very complex or very simple depending on the quality and signal needed. More appreciated though, will be the simplicity of these sensors that will allow them to be designed for minimal cost impact to the system. The vibration sensor 202 and/or its associated circuitry or the noise signal detector 242 and/or its associated circuitry may be found in the engine compartment of a vehicle, in the mobile transmitter itself, or in some other region in or near the vehicle.

Figure 7:
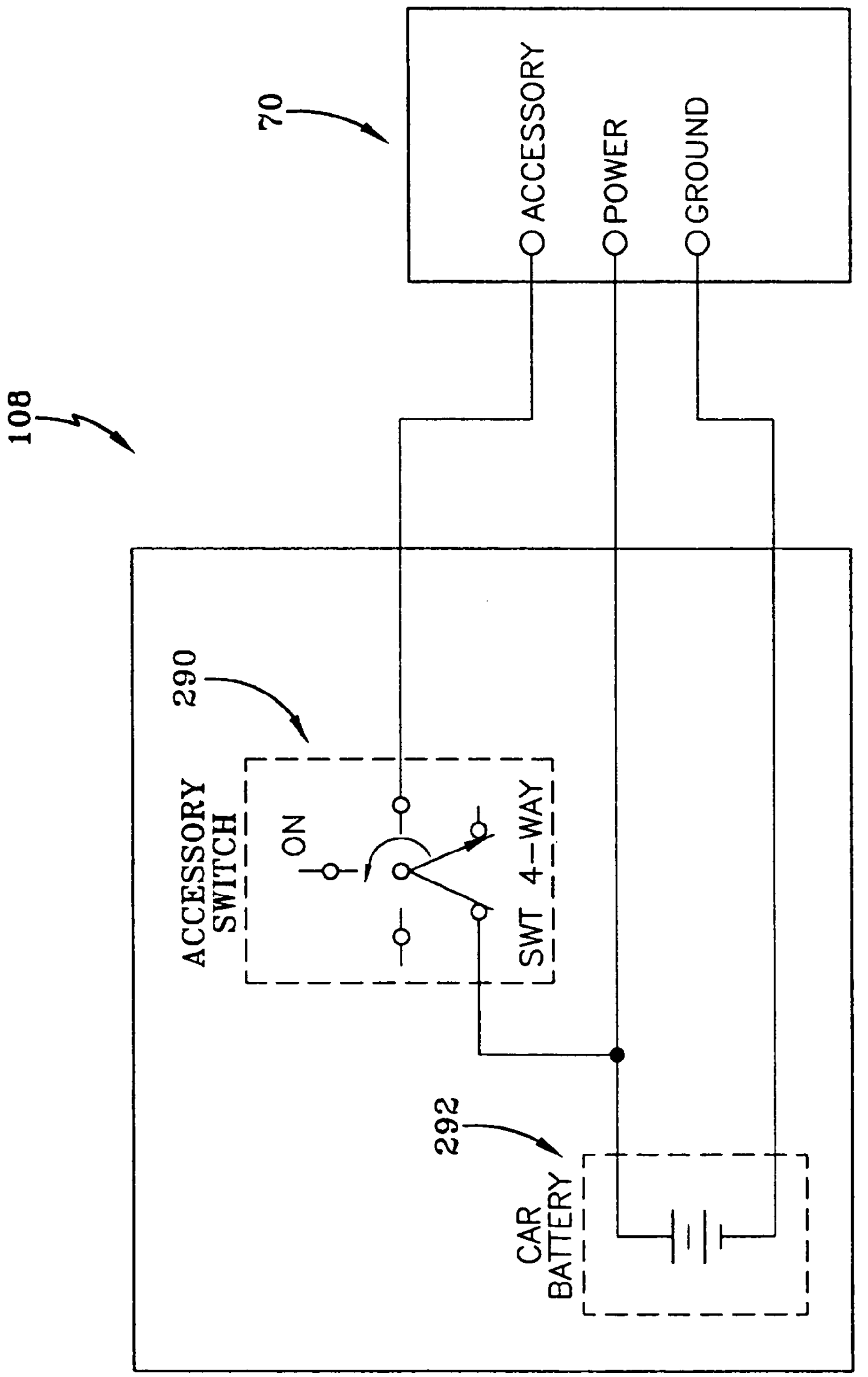
FIG. 7 is a schematic diagram of an exemplary mobile remote transmitter connected to the carrying device's power source.

Referring now to FIG. 7, and as previously discussed, the mobile transmitter 70 may be powered directly by the carrying device 108. In particular, the carrying device 108 includes an accessory switch 290 connected to a battery 292. The accessory switch is a four-way switch with at least an ignition position and an accessory position. The mobile transmitter 70 includes an accessory terminal, a power terminal, and a ground terminal. The battery's ground terminal 292 is connected to the ground of the mobile transmitter and the power terminal is connected to the positive lead of the battery 292. The accessory terminal is connected to the accessory position such that when a key received by the switch is turned to the accessory position, then the mobile transmitter 70 detects such an occurrence and performs in a manner that will be discussed.

Having the mobile transmitter 70 connected directly to the power supply in a vehicle provides advantages over a solely battery-powered proximity device. The three-wire configuration may be employed wherein a single wire provides constant power from the vehicle's battery. Another wire connects the accessory switch to the vehicle and as such powers the mobile transmitter, and a third wire provides the common ground connection to the vehicle. All three of these signals are normally found in an automobile or electric vehicle. This three-wire set-up could possibly be minimized to a two-wire set-up if the common/ground is attached to a metal chassis of the vehicle. In any event, the mobile transmitter draws power from the constant power supply of the vehicle and uses the accessory circuit as a means of detecting of when the vehicle is energized. By employing such a configuration, there is no need to worry about a "sleep time" for the transmitter device since it is now powered directly by the vehicle battery. As such, the power supply is connected to the mobile transmitter at all times. If the accessory switch is on, the mobile transmitter remains in an active state. However, if the accessory device is off, the mobile transmitter enters a sleep mode to minimize current draw from the vehicle's battery. And it will further be appreciated that the mobile transmitter always has the ability to relay any change of state (active/sleep) information to the base receiver maintained by the operator.

Use of the mobile transmitter with either the ignition or activity sensor enables features such as an auto-open and auto-close functionality for the garage door operator. For example, detection of the vehicle changing from an off-state to an on-state while the carrying device is within the garage and the barrier is closed, automatically causes the barrier to open. And if the carrying device is moved into the garage and the vehicle is then turned off, the auto-close feature automatically closes the barrier after a predetermined period of time. For example, for the auto-open feature, the user enters their car and then turns on the ignition. The mobile transmitter then detects either the vibration or spark plug noise, or switching by a key to the accessory position—not the ignition position—and activates the rest of the circuit. The mobile transmitter then transmit signals to the base receiver relaying the information that the vehicle or carrying device is now active. Accordingly, the controller associated with the base receiver would receive this information and the operator would initiate opening of the barrier. At any time after activating the accessory circuit, the person can start the vehicle and leave the enclosed area. And the mobile transmitter's hands-free functions will close the door at an appropriate time.

The auto-close feature would work in the following sequence. The user would park the vehicle in the garage and turn the vehicle off. The mobile transmitter would stop sending signals to the base receiver. The base receiver and controller, not detecting the presence of the mobile signals, would then generate a "door close" command to the operator to close the door.

C. Sensitivity Settings/Mobile Manual Input

Generally, the mobile transmitter 70 determines whether the carrying device is active and initiates communications with the base controller 52 via the base receiver 56. The mobile transmitter 70 is capable of generating various mobile signals with different transmit power levels and, if needed, with different identification codes to the base controller at an appropriate time. In response to the mobile signals generated by the mobile transmitter, the base controller 52 executes the appropriate door move or status change commands. It will be appreciated that FIG. 8 sets forth the operations of the mobile transmitter as it relates to button commands for programming or setting the desired sensitivity. The sensitivity level sets power levels to an approximate wireless signal range as to when a door is to be opened or closed. And the sensitivity level may dictate values for variable counters used for system sensitivity. For example, sensitivity settings may be very different for opening a garage door that is associated with a short driveway as opposed to one that has a very long driveway. Sensitivity settings may also be adjusted according to whether the garage door is located in an electrically noisy environment. A discussion is also provided as to how manual door move or cancellation commands are processed.

Figure 8A:
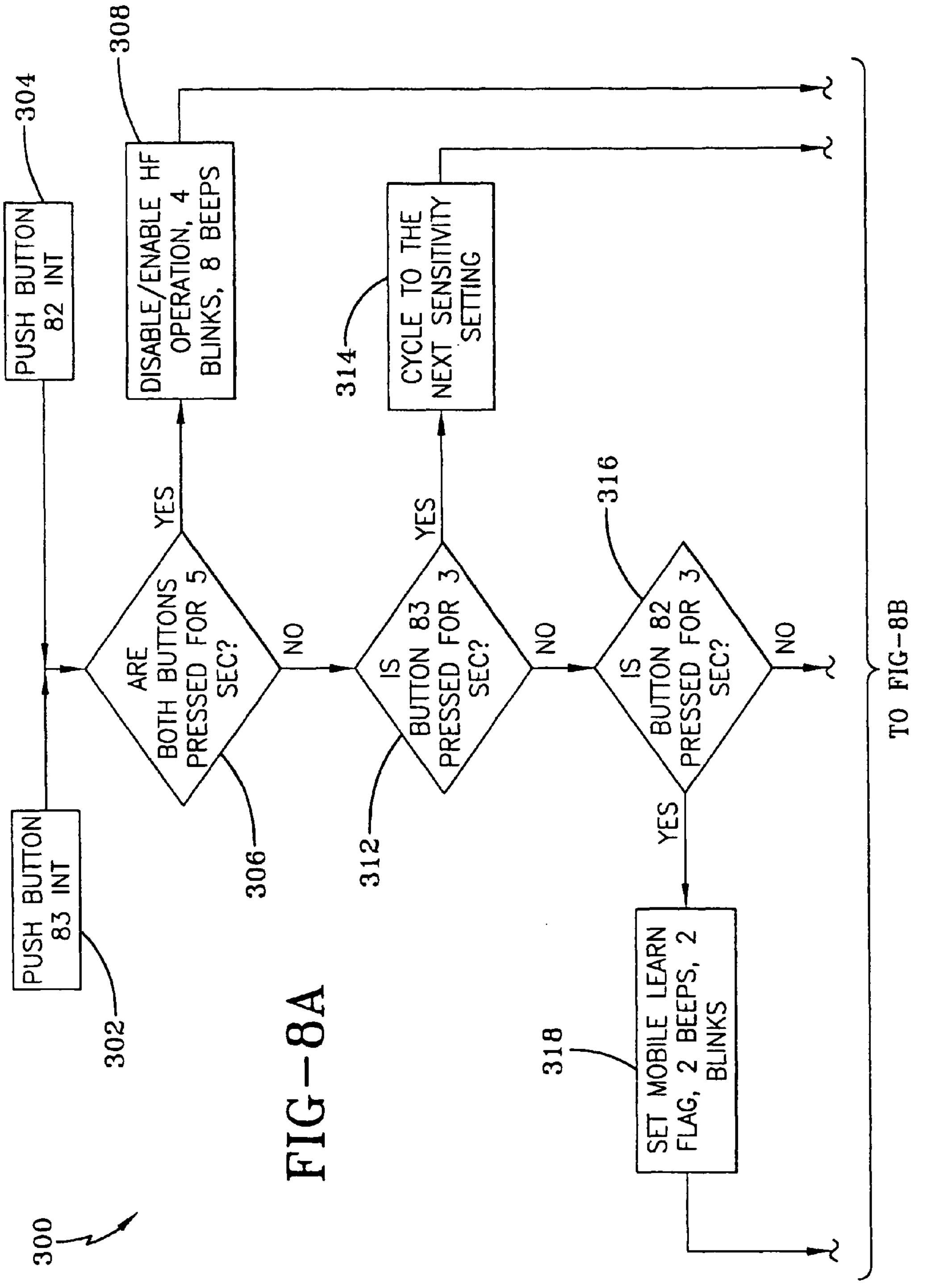
FIGS. 8A and 8B are an operational flowchart illustrating the initial programming and use of the mobile remote transmitter utilized in the operator system.
Figure 8B:
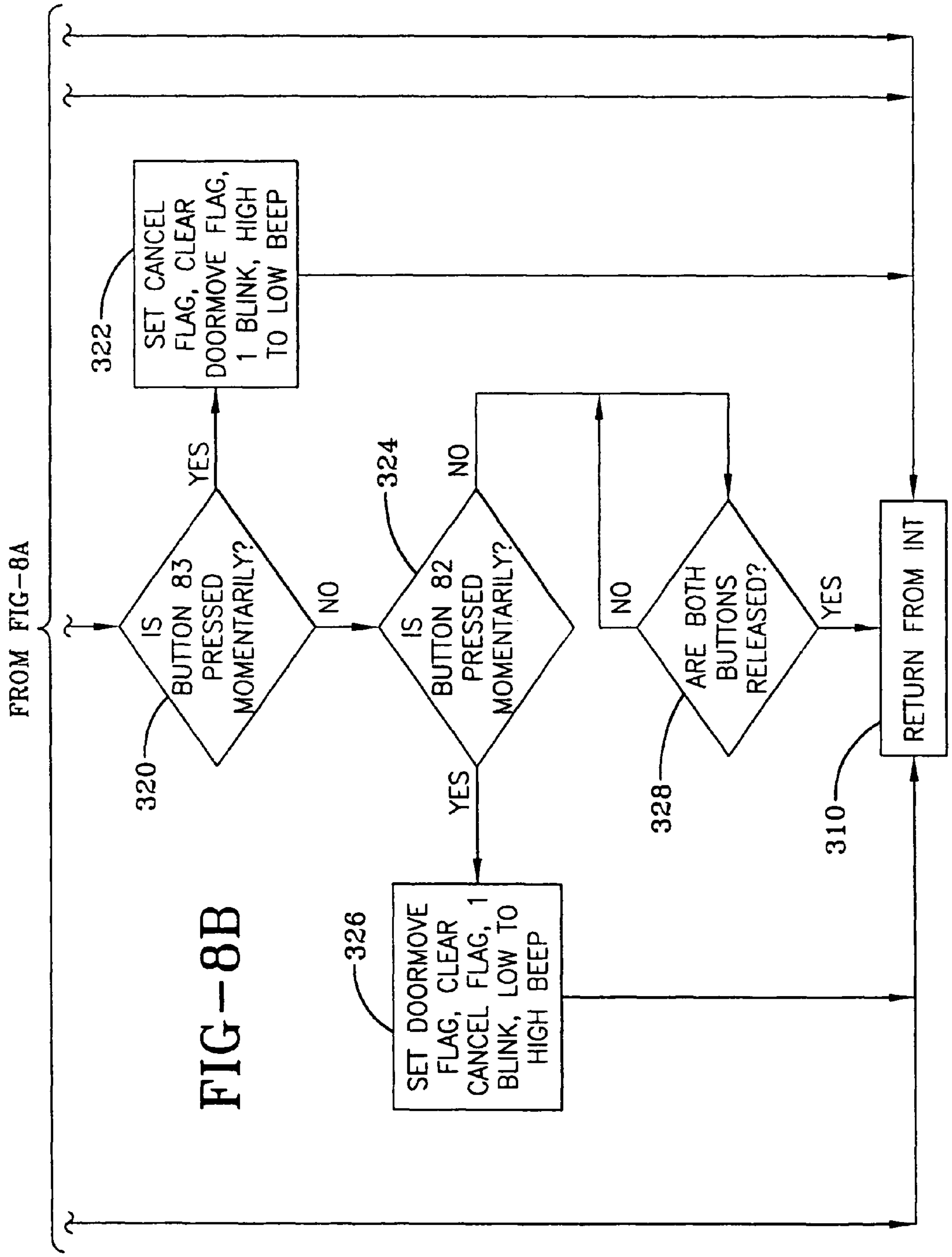

Referring specifically now to FIG. 8, it can be seen that a methodology for actuation of the buttons provided by the mobile transmitter 70 is designated generally by the numeral 300. As discussed previously, the mobile transmitter 70 includes a learn/door move button 82 and a sensitivity/cancel button 83. Accordingly, if the sensitivity/cancel button is actuated at step 302, or if the learn/door move button 82 is actuated at step 304, then the processor 72 makes an inquiry as to whether both buttons 82/83 have been pressed for five seconds or some other predetermined period of time. If so, the mobile transmitter 70 is disabled or enabled operation and this is confirmed by the four blinkings and eight beeps generated by the audio and light sources 94 and 96 respectively. It will be appreciated that other confirmation signals or sequence of beeps and blinking could be used. In any event, upon completion of step 308 the process returns to step 310 and the remote mobile transmitter 70 awaits a next button actuation. If at step 306 the buttons 82 and 83 are not pressed for the predetermined period of time then the processor 72 inquires at step 312 as to whether the sensitivity/cancel button has been pressed for a predetermined period of time such as three seconds. If the button 83 is held for more than three seconds, then at step 314 the processor 72 allows for cycling to a desired sensitivity setting. It will be appreciated that the mobile transmitter may be provided with one or more transmit power levels. In this embodiment, there are four power levels available and a different setting can be used for an open door command and a door close command such that a total of sixteen different sensitivity settings could be established. For example, the four power levels may be designated—from lowest to highest—as P0, P1, P2 and P3. Accordingly, one sensitivity setting could be OPEN=P0, CLOSE=P3; another as OPEN=P1, CLOSE=P3 and so on for a total of sixteen available settings. If at step 312 it is determined that button 83 has not been pressed for more than three seconds, the process continues to step 316 to determine whether the learn/doormove button has been pressed for a predetermined period of time, such as three seconds, or not. If the learn/doormove button has been pressed for more than three seconds, then at step 318 the mobile learn flag is set and this is confirmed by the beeping of the audio source 94 twice and the blinking of the light source 96 twice. Upon completion of the confirmation, the process proceeds to step 310 and normal operation continues. If, however, at step 316 it is determined that the learn/doormove button has not been pressed for three seconds, then the process continues to step 320 where the processor 72 determines whether the sensitivity/cancel button has been momentarily pressed or not. If the button 82 has been pressed, then at step 322 a cancel flag is set, a doormove flag is cleared, and a confirmation signal in the form of one blink by the light source 96 and a high to low beep generated by the audio source 94. And then the process is completed at step 310.

If at step 320 the sensitivity/cancel button 83 is not pressed momentarily, then the process inquires as to whether the learn/door move button 82 has been momentarily pressed or not at step 324. If the button 82 has been momentarily pressed, then at step 326 the doormove flag is set, the cancel flag is cleared and a confirmation is provided in the form of one blink and a low to high beep or audio tone. This step allows for execution of a manual doormove command if desired. If button 82 is not momentarily pressed at step 324, then the processor, at step 328, awaits for both buttons to be released. Once this occurs then the process is completed at step 310.

III. Mobile/Operator Operation

Figure 9:
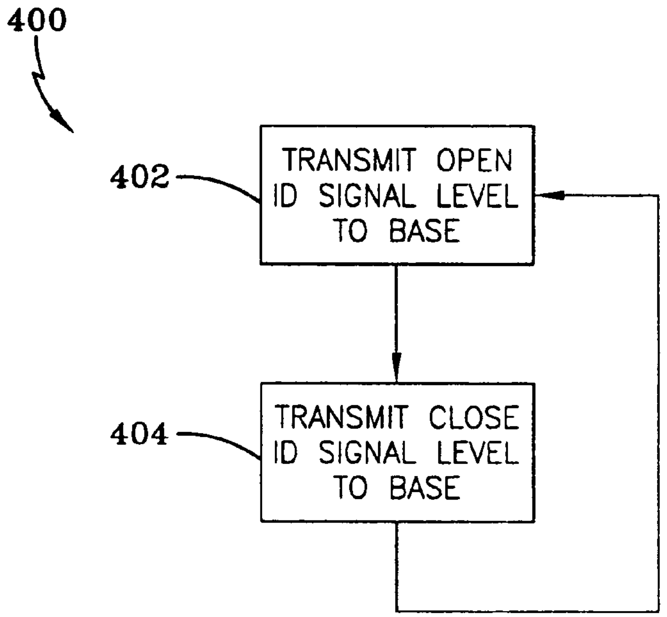
FIG. 9 is an operational flowchart illustrating the operation of the mobile transmitter utilized in the operator system.
Figure 10A:
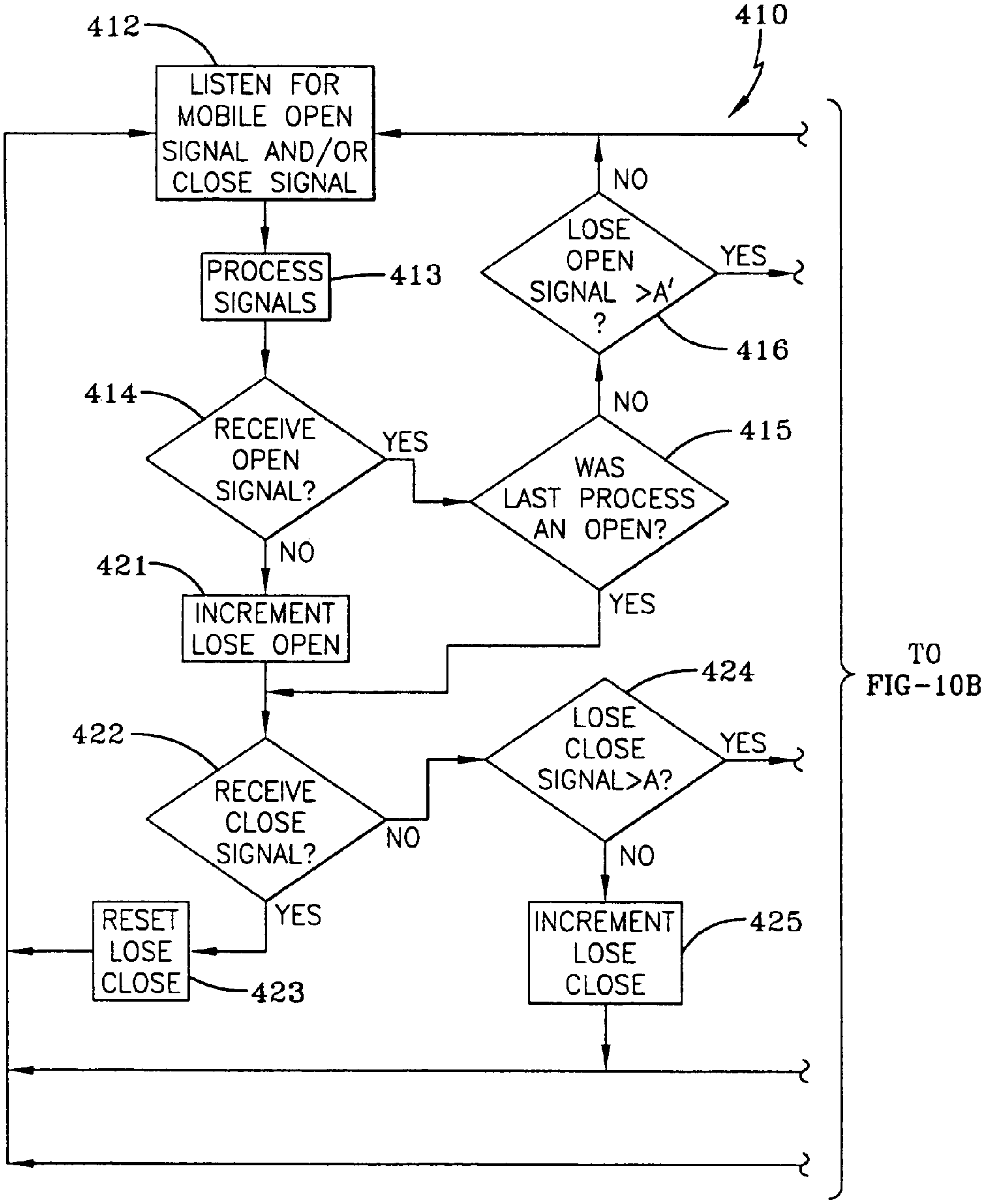
FIGS. 10A and 10B are an operational flowchart illustrating the operation of the base controller and the mobile transmitter.
Figure 10B:
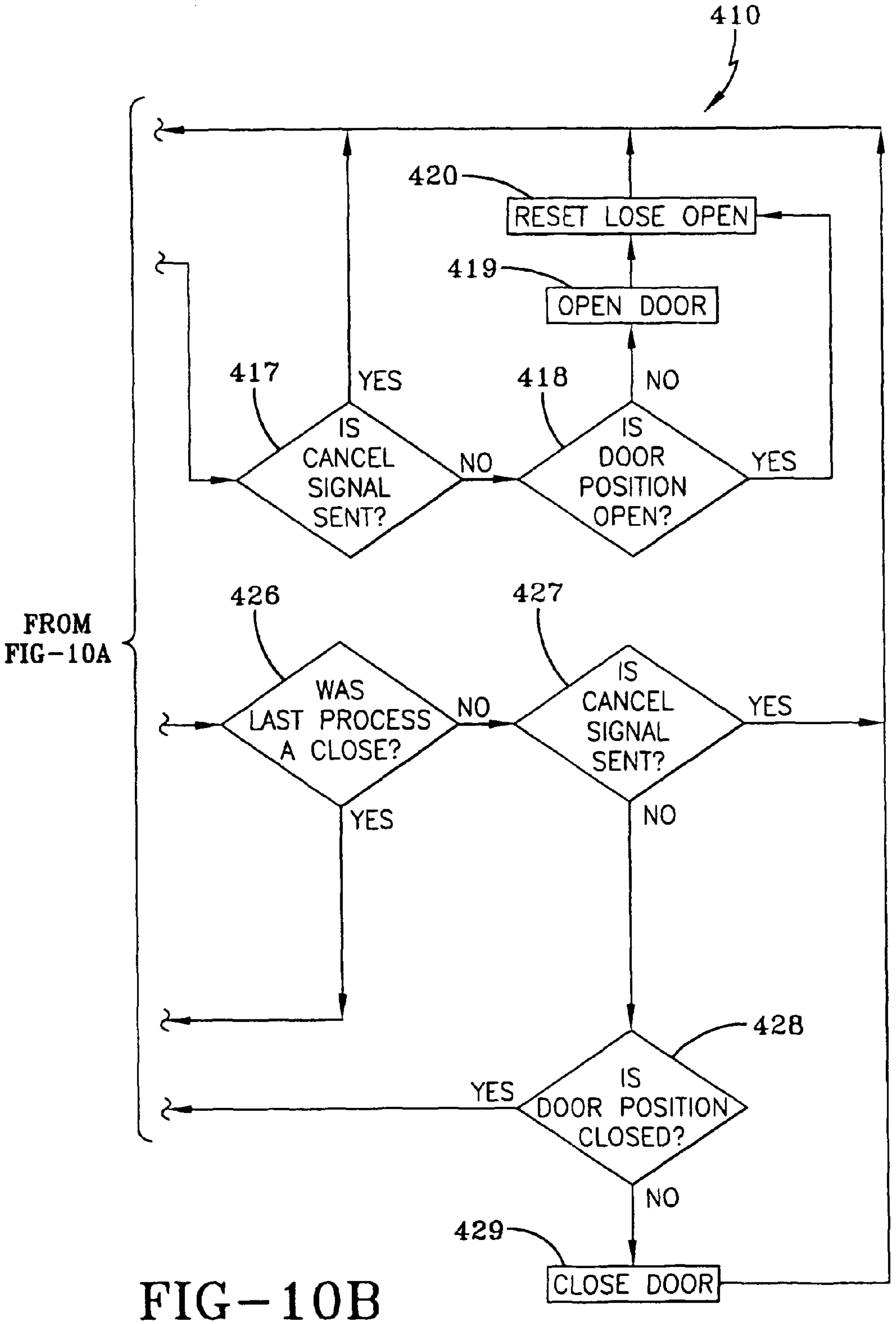

FIGS. 9-11 are directed to a first embodiment wherein the mobile transmitter somewhat periodically generates an open identification signal and then a close identification signal and wherein both are received by a base controller for the automatic opening and closing of the barrier.

Figure 12:
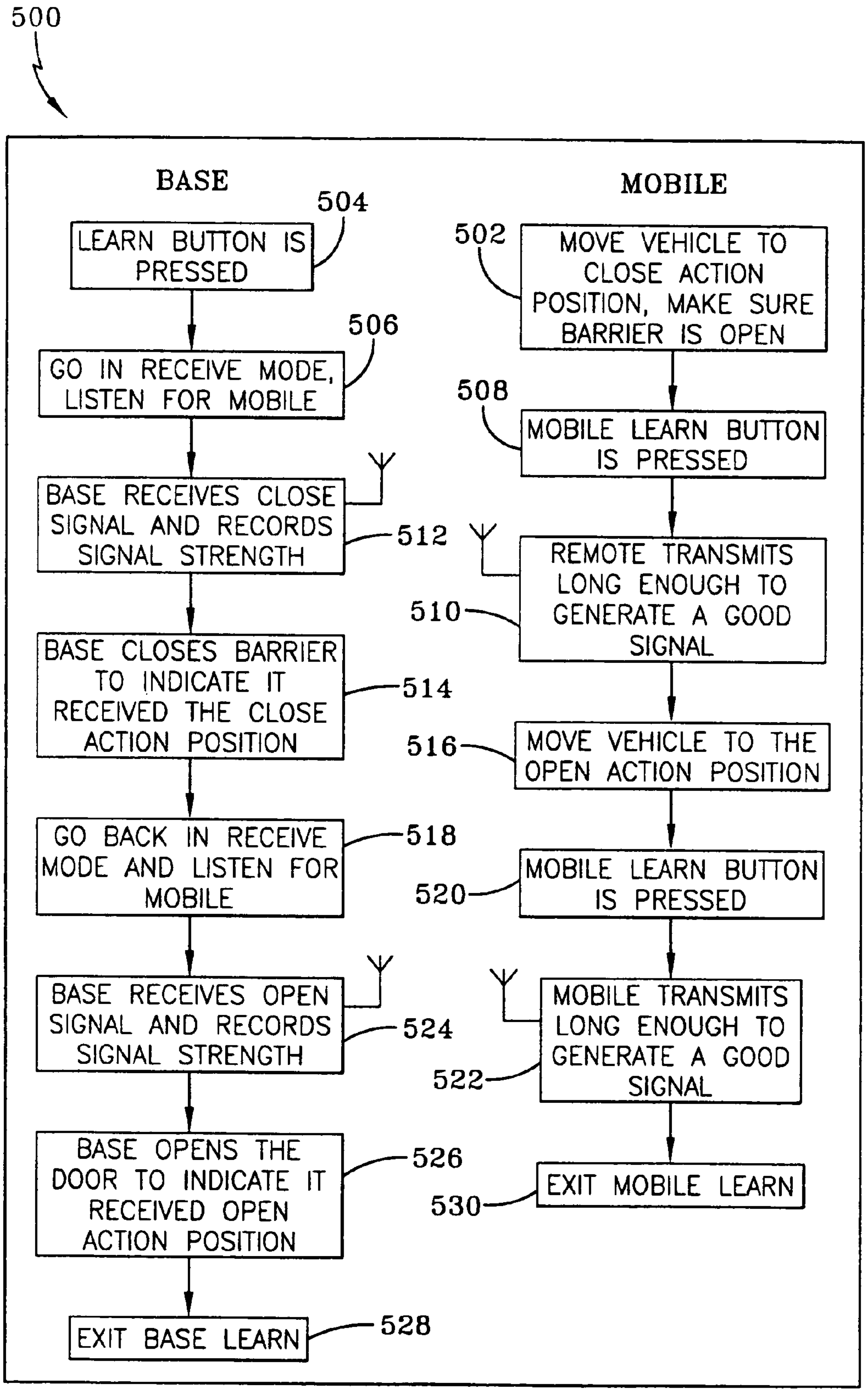
FIG. 12 is an operational flowchart illustrating profiling steps of the mobile transmitter and the base controller in an alternative embodiment of the present invention.
Figure 13:
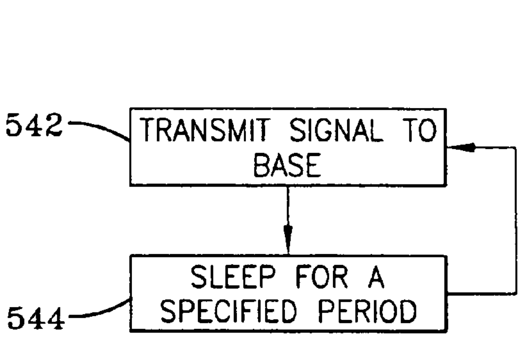
FIG. 13 is an operational flowchart illustrating the operation of the mobile transmitter utilized in the alternative embodiment.
Figure 14:
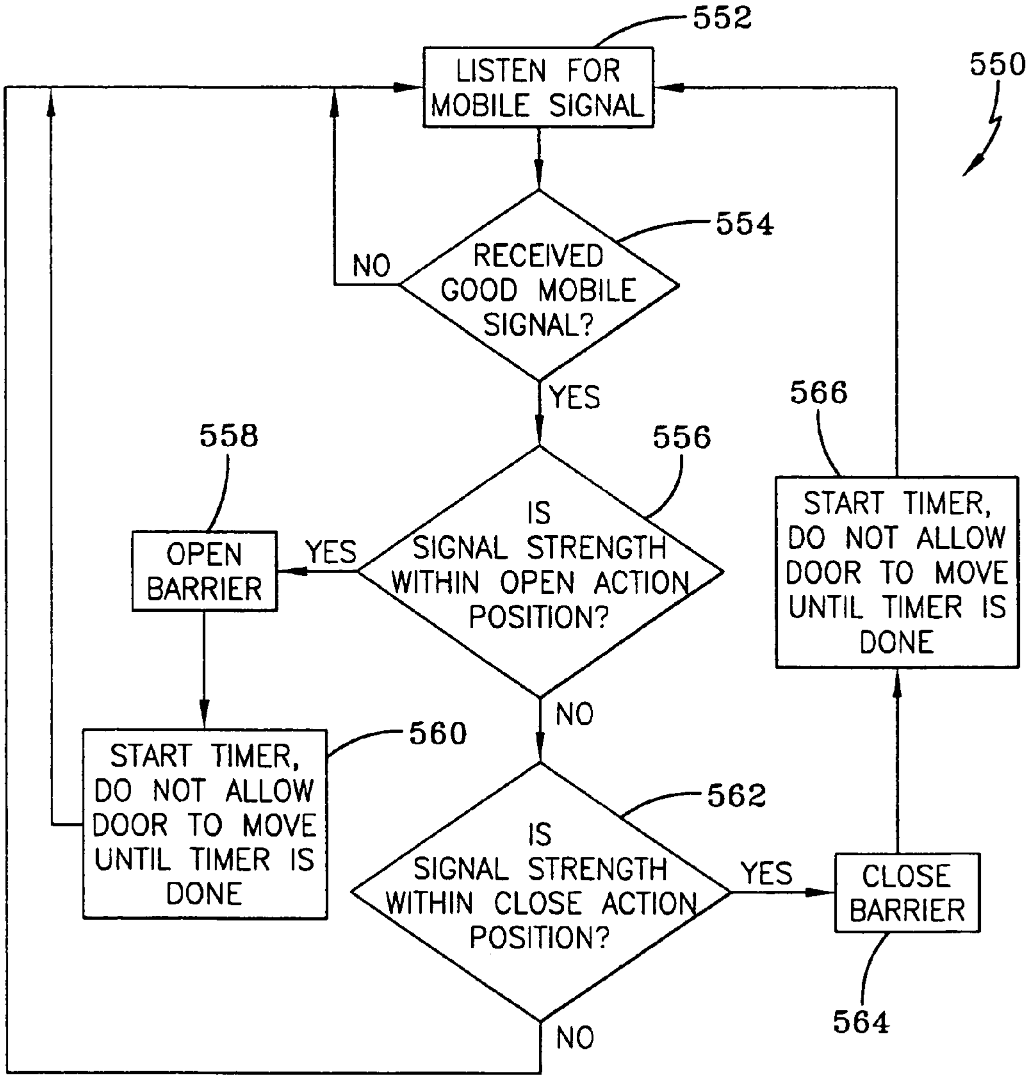
FIG. 14 is an operational flowchart illustrating the operation of the base controller in conjunction with the mobile transmitter utilized in the operator system according to the alternative embodiment.

FIGS. 12-14 are directed to an alternative embodiment which utilizes signal strength of the mobile transmitter for automatic opening and closing of the barrier. The hands-free methodologies discussed herein allow manual operation to open the door before leaving and closing the door after arriving. As used herein, the phrase manual operation refers to user actuation of a button on the wall station transmitter, the remote transmitter, the mobile transmitter or the keypad transmitter.

A. Dual Transmitter Signals

Referring now to FIG. 9, it can be seen that a methodology for operation of the mobile transmitter 70 is designated generally by the numeral 400. Ideally, the mobile transmitter is powered by a self-contained battery that may or may not be re-chargeable. Accordingly, the mobile transmitter is always on and generating identification signals. At step 402, the mobile emitter 76 generates a mobile signal 78 in the form of an open identification signal that is receivable by the base receiver 56. Subsequently, at step 404, the emitter 76 generates a close identification signal that is also receivable by the base receiver 56. Upon completion of step 404 the process returns to step 402. It will be appreciated that the time period between steps 402 and 404 may randomly change so as to avoid radio frequency interference with other remotes. As previously discussed, the open identification signal and the close identification signal may be transmitted at equal or different power levels, but in either case the base receiver is able to distinguish between the two. The setting of the power levels, as discussed in relation to FIG. 8, facilitates operation of the system 10. Initially, the identification signals are established at the manufacturing facility, but the amplitude of the signals are adjustable by the consumer or installer. In addition to the open and close identification signals it will be appreciated that the mobile transmitter can also send a “command” signal when activated manually. In any event, each identification signal can have a different signal strength (amplitude) wherein the present embodiment allows for four signal strengths for each identification signal. Of course, any number of different signal strengths could be used. The amplitude settings can be programmed by the consumer or the installer with a program button responding to audible or visual signals provided by the respective sources on the transmitter. It is believed that the consumer or installer will set the individual signal strengths differently so that the arriving identification signal—the signal used to open the barrier—will have a higher strength signal than the departing identification signal—the signal used to close the barrier. Accordingly, the arriving identification signal causes the base controller to generate a “command” to open the door sooner and lack of detection of the lowest strength identification signal causes the base station to generate a “command” to close the door sooner. However, based upon the customer’s needs, both identification signals could be the same strength. As will be discussed, it is possible that hands-free control of an actuation system, such as a garage door, could be accomplished with a single identification signal. In the alternative, if the mobile transmitter’s operation is controlled by the activity sensor 84, then the steps 402 and 404 are only implemented when the carrying device is on. When the carrying device is off, the open and close identification signals are not generated, but a manual button push would generate the corresponding command signal.

Referring now to FIG. 10, a basic methodology for operation of the base controller 52 is designated generally by the numeral 410. Initially, it will be appreciated that the remote mobile transmitter 70 is learned to the controller 52 in a conventional fashion by actuation of learn button 59 on the controller and actuation of one of the buttons 82/83 on the transmitter 70. Of course, other learning methods could be used. In this basic methodology, the base controller maintains a variable identified as “last process,” which is initially set equal to “open” wherein this variable may be changed to “close” when appropriate. Other variables may be maintained to supplement and enhance operation of the system. For example, “lose open” and “lose close” variable counts are maintained to ensure that the mobile transmitter is in fact out of range of the base operator before any specific action is taken.

The controller 52 monitors frequencies detected by the base receiver 56, and in particular listens for an open signal and/or a close signal generated by the mobile transmitter at step 412. Next, at step 413 the methodology begins processing of the signals. At step 414 the base controller determines whether an open signal has been received or not. If an open signal has been received, then the controller 52 investigates the "last process" variable at step 415 to determine whether the last course of action was an "open" door move or a "close" door move. If the last process variable was not "open," then at step 416, the controller queries as to whether a process variable "lose open" is greater than A'. This query is made to ensure that an inappropriate action is not taken until the mobile transmitter is in fact away or out of range of the base controller. If the lose open variable is not greater than A', then the process returns to step 412. However, if the lose open variable is greater than A', the controller queries as to whether a cancel signal has been sent by the mobile transmitter or not at step 417. If a cancel signal has been sent, then the process returns to step 412 and any door move command that would otherwise be generated by the controller is not sent. If a cancel signal has not been received at step 417, then at step 418 the controller 52 determines whether the door position is open or not. As noted previously, the controller is able to detect door position by use of mechanisms associated with the door movement apparatus. In any event, if the door position is open, the process continues to step 420 and the variable lose open is reset and then the process returns to step 412. However, if the door position is not open, as determined at step 418, then at step 419 the controller executes an open door command and the variable last process is set equal to open. And at step 420, the variable lose open is reset to a value, typically zero. Upon completion of step 420, the process returns to step 412.

Returning to step 414, if an open signal is not received, then at step 421 the lose open variable is incremented and the process continues at step 422. Or if at step 415 the last process variable is designated as open, then the process continues on to step 422 where the controller determines whether a close signal has been received or not. If a close signal has been received, then a "lose close" variable is reset and set equal to zero at step 423 and the process returns to step 412. However, if at step 422 a close signal has not been received, then the process, at step 424, queries as to whether the lose close variable value is greater than a designated variable value A. If the answer to this query is no, then at step 425 the lose close variable is incremented by one and the process returns to step 412. The lose close variable is used so that a specific number of consecutive close signals must be lost or not received before an actual close door move command is generated. Accordingly, if the lose close signal is greater than variable A at step 424, the controller queries as to whether the variable last process was a close at step 426. If so, then the process returns to step 412. As will be appreciated, this procedural step prevents the base controller from closing/opening the door or barrier multiple times when the mobile transmitter is in a transitional position.

If at step 426 the last process variable is not equal to close, then at step 427 the process inquires as to whether a cancel signal has been received or not. If a cancel signal has been received, then the process returns to step 412. If a cancel signal has not been received, then at step 428 the controller inquires as to whether the door position is closed or not. If the door position is closed, then the process returns to step 412. However, if the door position is not closed, then at step 429 the base controller generates a door close command and the door is closed and the variable last process is set equal to close, whereupon the process returns to step 412.

As can be seen from the methodology 410, a simple use of an open signal and a close signal automatically generated by an active mobile transmitter enables the hands-free operation so as to open and close a barrier depending upon the position of the mobile transmitter and whether the position of the door is determined to be open or closed. The disclosed methodology is simple to implement and has been found to be effective in operation for most all residential conditions. It will be appreciated that the methodology shown in FIGS. 10A and 10B and described above is adaptable for use with a single identification signal. In such an embodiment, the steps 414 and 422 would be replaced with a single query as to whether a signal from the mobile transmitter has been received or not. If a signal is received, the process would reset the lose close variable (step 423) and continue to step 415, where a YES response will direct the process to step 424. If a signal is not received, then the process will go directly to step 424. Step 425 would also increment the lose open variable (step 421).

Figure 11A:
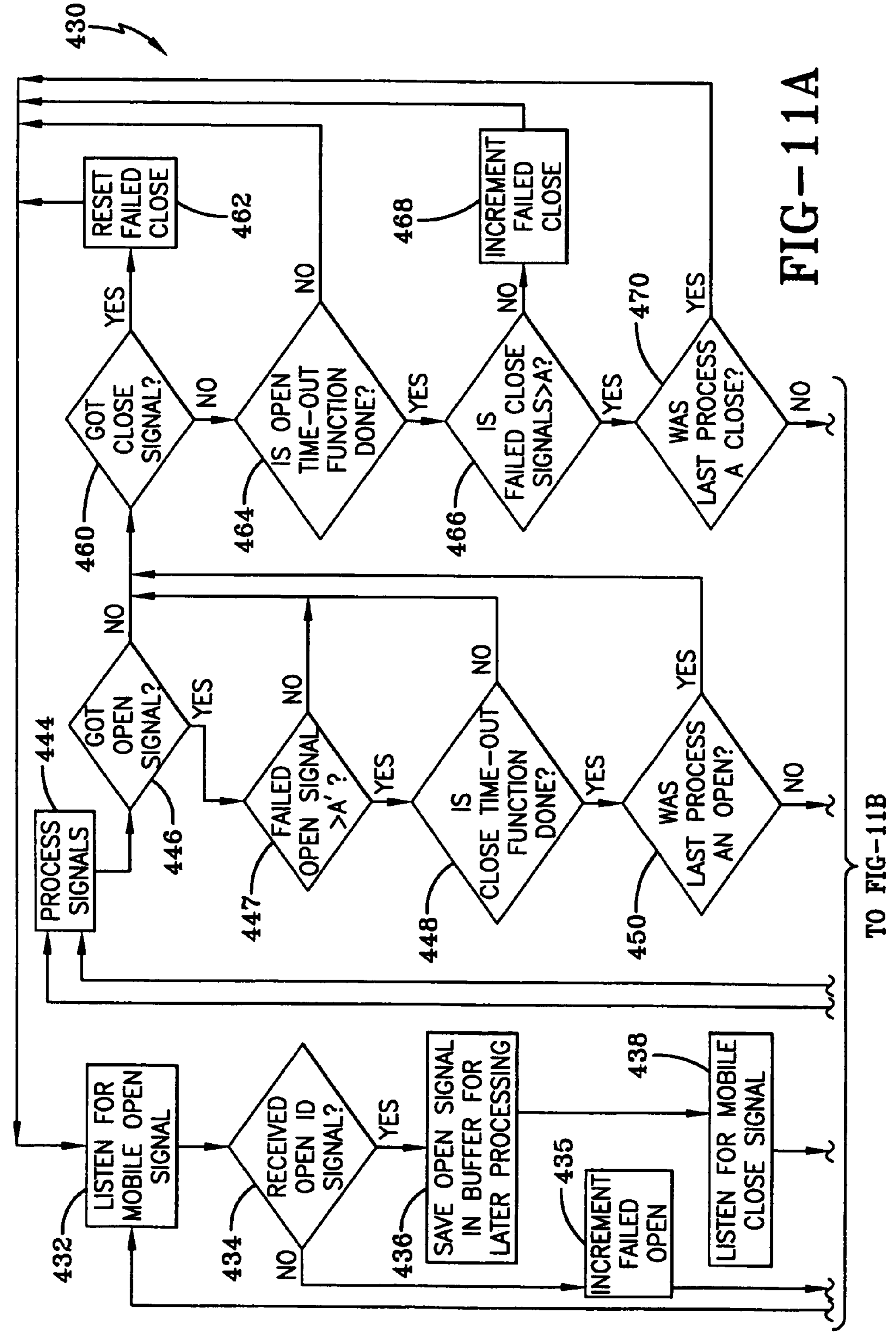
FIGS. 11A and 11B are a more detailed operational flowchart illustrating the operation of the base and the mobile transmitter.
Figure 11B:
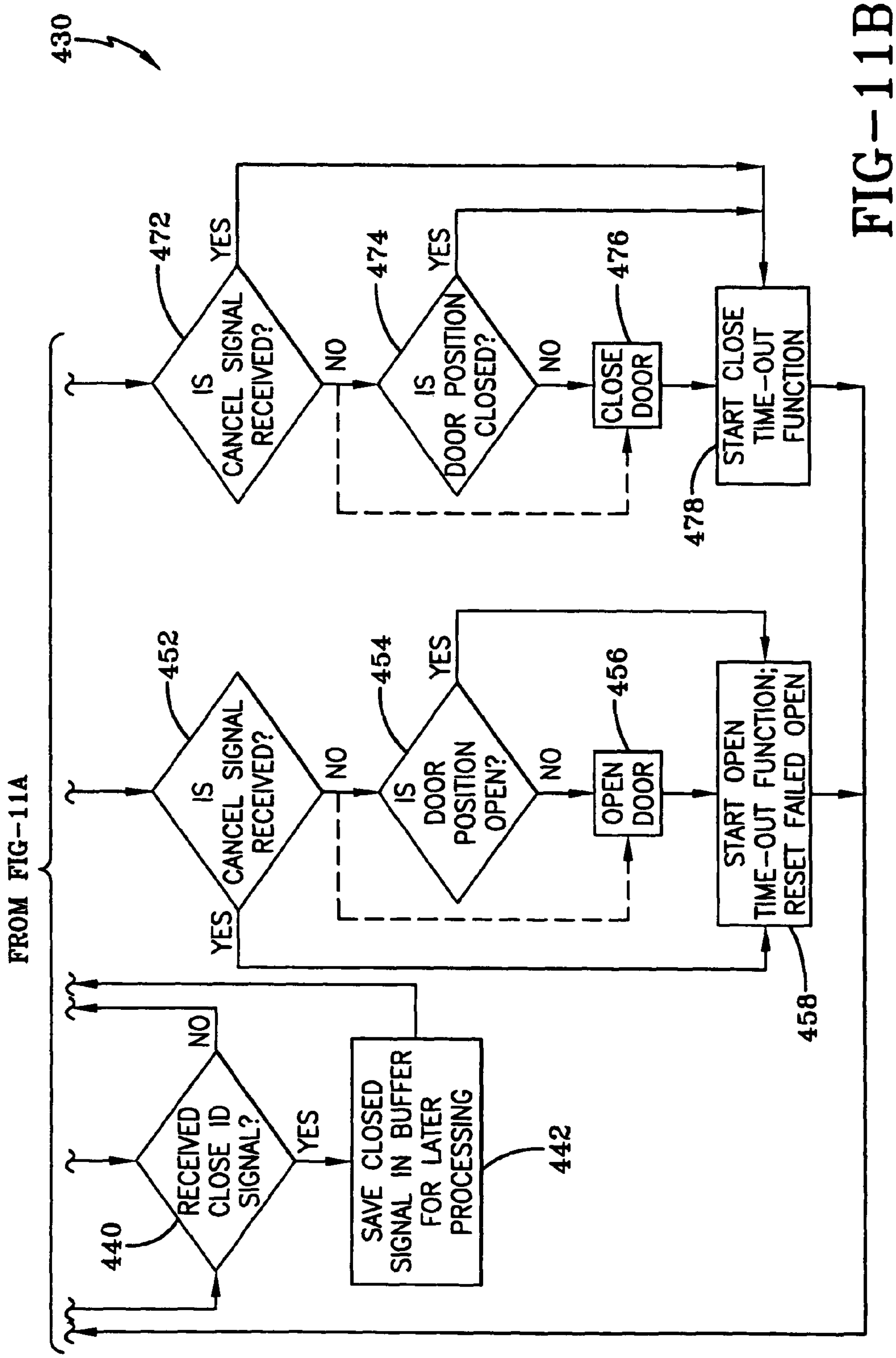

Referring now to FIGS. 11A and 11B, a more detailed methodology for operation of the base controller 52 is designated generally by the numeral 430. As with the basic operation, the remote mobile transmitter 70 may be learned to the controller 52 in a conventional fashion by actuation of a learn button 59 on the controller and actuation of one of the buttons 82/83 on the transmitter 70. And in the detailed version, the base controller utilizes information as to whether the door is in an open or closed condition, and whether the last course of action was an open or close movement. Other variables may be maintained to supplement and enhance operation of the system. Additionally, at least one door move time-out function and ideally two time-out functions are used so as to allow for ignoring of the mobile signals during an appropriate period following a door move. As used here-in, the time-out function may be implemented with a timer maintained by the controller having a specific time value, or the time-out function may be associated with an expected number of mobile signals to be received, wherein the frequency of the generated mobile signals is known by the base controller and a count associated therewith. In other words, after a door move operation, although mobile signals continue to be received by the base controller, the time-out function prohibits mobile signals from being acted upon until completion thereof.

As a first step 432, the controller 52 listens for the open identification signal. Next at step 434, the controller monitors for receipt of the open identification signal. If an open identification signal is not received, then at step 435 a variable failed open is incremented by one and the process continues to step 440. However, if an open identification signal is received, then the process proceeds to step 436 where the open identification signal is saved in an appropriate buffer for later processing. Next, at step 438 the base operator listens for a close identification signal generated by the mobile transmitter. Next, at step 440, upon completion of step 438, or if at step 434 an open identification has not been received, then the base operator determines whether a close identification signal has been received or not. If a close identification signal is received, then at step 442 the close identification signal is saved in an appropriate memory buffer for later processing.

Upon completion of step 442, or if the close identification signal is not received at step 440, the process continues to step 444 for the purpose of processing the identification signals whether they have been received or not. Accordingly, at step 446 the base operator controller 52 determines whether an open identification signal had been received or not. Upon completion of this query at step 446, the buffer associated with the open identification signal is cleared. In any event, if an open identification signal is in the buffer, then at step 447, the controller determines whether the failed open variable is greater than A' or not. If not, then process proceeds to step 460. If the failed open variable is greater than A', then at step 448 the controller 52 determines whether a close time-out function has elapsed or not. The close time-out function or timer, which has a predetermined period of time, is started after completion of a door close operation. In any event, if the close time-out function has elapsed, then at step 450 the controller determines whether the last course of action was a door open movement. If the last course of action was not an open movement, then at step 452 the controller queries as to whether a cancel signal has been received or not. If a cancel signal has not been received, then at step 454 the controller inquires as to the status of the door position. If the door is closed—not open—then at step 456 the base controller generates an open door move command at step 456. And then at step 458 an open time-out function is started and the variable failed open is reset. Upon completion of step 458 the process returns to step 432.

Returning to step 452, if a cancel signal has been received then the process immediately transfers to step 458, the open time-out function is started, and the process returns to step 432. It will be appreciated that in the present embodiment, the operator controller may know the position of the door. This is by virtue of position detection mechanisms internally or externally associated with the base operator controller 34. In the event such position detection mechanisms are not available, then step 454 may be ignored as indicated by the dashed line extending from query 452 to command 456. In any event, if the door position, at step 454, is determined to be open, then step 456 is bypassed and at step 458 the open time-out function is started.

If at step 446 an open signal is not stored in the buffer, or at step 448 the close timer is not completed, or if at step 450 the last action was an open movement, then the process continues to step 460. At step 460 the controller inquires as to whether the close signal buffer has a close signal retained therein. If a close signal has been received, then at step 462 the variable failed close is reset and the process returns to step 432. However, if at step 460 a close identification signal is not in the buffer, then the process proceeds to step 464. It will be appreciated that upon each completion of step 460, the close signal buffer is cleared. In any event, at step 464 the controller inquires as to whether the open time-out function has elapsed or not. If not, then the process returns to step 432. If the open time-out function has elapsed at step 464, then at step 466 the controller inquires as to whether the variable failed close is greater than a predetermined value A. This variable is utilized to prevent any false closings because of radio frequency interference, other signal interference, or null values. If the failed close variable is not greater than A, then at step 468 the failed close variable is incremented by one and the process returns to step 432. However, if at step 466 the failed close variable is greater than A, then the controller makes an inquiry at step 470 as to whether the last course of action was a door close movement. If the last course of action was a door close movement, then the process returns to step 432. However, if at step 470 the last course of action was not a door close movement, then the process continues to step 472 to determine whether a cancel signal has been received or not. If a cancel signal has been received, then the close time-out function is started at step 478 and then the process continues on to step 432.

If a cancel signal has not been received at step 472, then the process proceeds to step 474 to determine whether the door position is closed or not. If the door position is not closed, then at step 476 a door close command is generated by the base controller and then at step 478 the close time-out function is started. However, if the door position is closed, as determined at step 474, step 476 is bypassed and steps 478 and 432 are executed. If the controller is unable to determine whether the door position is open or closed, then step 474 is bypassed and step 476 is executed.

From the foregoing descriptions it will be appreciated that if the door or barrier is in a closed condition when the two identification signals arrive, the base controller sends a command to the motor controls to open the door and start a time-out function to prevent the door from closing for a predetermined period of time regardless of any additional identification signals received. If the door is determined to be open when the identification signals are received by the base receiver, the base controller will not send a command to the motor controls until the base controller no longer receives a close identification signal. Once the door is closed in this scenario, the time-out function is initiated and the base controller ignores any open identification signals received during the time-out function period. As a result, the base controller will not allow an open door to close until the time-out function is complete, nor will a closed door be allowed to open until the time-out function is complete. The mobile transmitter close identification signal must go out of range to close the door, thus the open identification signal will not be recognized until after the transmitter has been out of range for a predetermined period of time. In other words, only the loss of the close signal after completion of the time-out function will result in closing the door, regardless of what the open signal is doing. And the loss of the open signal for the time-out function period must occur before receipt of an open signal will be acted upon by the base controller.

In the event the mobile transmitter is connected to the accessory circuit of a carrying device, the mobile transmitter will send identification signals as soon as key movement to an accessory or position is detected. In essence, turning the ignition on initiates the processing as set forth in FIGS. 10 and 11. In a similar manner, when the carrying device's key is moved to the off position, presumably when the carrying device is in the garage, the normal processing by the base controller will initiate a door close operation unless the door has already been closed.

It will also be appreciated that the remote mobile transmitter may be activated or manually turned on when one arrives closer to the destination so as to begin sending identification signals. Such a feature would also allow for further power savings on the mobile transmitter.

B. Signal Strength

In FIGS. 12-14 an alternative procedure utilized by a mobile transmitter that generates periodic signals can also be implemented. Generally, in this embodiment the mobile transmitter sends a single identification signal to the base controller which determines the signal strength associated with a particular position of the carrying device that carries the mobile transmitter and opens or closes the door accordingly.

Referring now to FIG. 12, the methodology for learning the signal strengths associated with opening and closing the barrier is designated generally by the numeral 500. A sequence of operations associated with both the base and the mobile devices are side-by-side and the following description sequences through the normal operational steps; however, it will be appreciated that the steps may be performed in a slightly different order and still allow for the learning of the profiles associated with the mobile transmitter. In any event, at step 502 the user moves the carrying device to a close action position with the barrier placed in an open position. Next, at step 504, the learn button 59 on the base controller is actuated and the controller 52 enters a receive mode to listen for the mobile transmitter at step 506. Next, at step 508, the learn button 82 on the mobile transmitter 70 is pressed. At step 510, the mobile transmitter transmits long enough to generate a high quality signal. At step 512 the base receiver 56 receives and records a close signal strength and stores this in the memory 54. And at step 512, the base controller closes the barrier to indicate that it has received the close action position to be associated with the mobile transmitter.

At step 516, the user moves the vehicle or carrying device to an open action position and at step 518 the base controller returns to a receive mode and listens for the next actuation of the mobile transmitter. Once the desired open action position is achieved, the user actuates the learn button on the mobile transmitter and an appropriate signal is transmitted at step 522 long enough to generate an adequate signal. Next, at step 524 the base controller acknowledges receipt of the action position and records the appropriate open signal strength at step 524. Next, at step 526, the base controller opens the door to indicate that it has received the open action position. Finally, at step 528 the base controller exits the learn mode and the mobile transmitter exits its learn mode at step 530.

Confirmation and exiting of these various steps may be confirmed by generation of audible beeps or visual flashing of the lights associated with both the mobile transmitter and the base controller. Once the profile procedure has been learned, the mobile transmitter generates signals based upon whether the activity sensors 84/84' are detecting operation of the carrying device.

Referring now to FIG. 13, it can be seen that the operation of the mobile transmitter is designated generally by the numeral 540. At step 542, the mobile transmitter transmits a mobile signal to the base controller. Subsequently, at step 544, the transmitter sleeps for a specified period of time and then returns to step 542. Accordingly, a mobile signal is periodically generated by the mobile transmitter to avoid contention with other remote or mobile transmitters. And the sleep period may vary randomly after every transmission. If the remote runs on batteries, it will never turn off unless the remote utilizes an activity sensor as previously described. As discussed, this would allow the remote to conserve power by sleeping when the vehicle is not active and a signal is not needed. Alternatively, the mobile transmitter could be powered by the vehicle's power supply and would know when the vehicle is active and as such would shut down the mobile transmitter when the vehicle is off. The mobile transmitter will use known methods of digital modulation that comply with the general requirements as set forth above when it is transmitting an appropriate signal to the base controller. It could also use the method of encryption previously referred to. And as in the previous embodiment, the mobile transmitter could be actuated manually by pressing the appropriate button any time a door move command is desired or if hands-free operation is to be temporarily disabled.

Referring now to FIG. 14, operation of the base controller for this alternative embodiment is designated generally by the numeral 550. At step 552, the base controller 52 awaits or listens for the mobile signal generated by the mobile transmitter 70. Next, at step 554, the controller 52 queries as to whether the base receiver 56 has received a good mobile signal or not. If not, then the process returns to step 552. But, if a good mobile signal is received at step 554, then at step 556 the base controller 52 determines whether the signal strength associated with the receive signal is within the open action position. If so, then at step 558 the base controller 52 generates a command received by the motor to open the barrier. Upon completion of the open barrier movement the controller 52 at step 560 initiates or starts a timer for a predetermined period of time so as to prevent the barrier from moving until the time period has elapsed and then the process returns to step 552.

If however, at step 556, it is determined that the received signal strength is not within the open action position, then the process proceeds to step 562 to determine whether the received signal strength is within the close action position. If the received mobile signal is not within the close action position, then the process returns to step 552. However, if the signal strength of the mobile signal is determined to be within the close action position, then at step 564 the barrier is closed. Finally, at step 566, a timer is started for a predetermined period of time so as to prevent the door from moving until the time period has elapsed.

Based upon the foregoing, the advantages of the described embodiments are readily apparent. The benefits of the disclosed methodologies utilize a mobile transmitter which periodically generates signals depending upon whether the carrying device is on or not. If the vehicle is determined to be on, then generation of periodic signals by the mobile transmitter are received by the base controller to initiate door movement. The disclosed methodologies eliminate the need for the base controller to generate signals which are received by the mobile transmitter and as such interruption in signals generated by the base controller, which might otherwise interfere with the operation of the system, are avoided. The proposed system is also advantageous in that manual user input is not required and the user has the ability to set sensitivity for when an open command and a close command are generated based upon the position of the carrying device with respect to the access barrier. A variation of the system would allow existing operator systems to be adapted for hands-free use.

Thus, it can be seen that the objects of the invention have been satisfied by the structure and its method for use presented above. While in accordance with Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A discrete add-on processing system adapted to be connected to a barrier operating system which includes a barrier operator that moves a barrier between open and closed positions, the processing system comprising:

at least one mobile transmitter automatically and periodically generating both a close mobile signal and an open mobile signal regardless of location;

a barrier position indicator generating a barrier position signal; and an add-on controller adapted to be connected to the barrier operator of the barrier operating system, said add-on controller receiving both said mobile signals and said barrier position signal so as to enable the barrier operating system to open the barrier after receiving said open mobile signal and after having not received said open mobile signal for a period of time if said barrier position signal indicates that the barrier is in a closed position, and close the barrier after receiving said close signal and after having not received said close mobile signal for a period of time if said barrier position signal indicates that the barrier is in an open position.

2. The processing system according to claim 1, further comprising:

a receiver connected to one of said add-on controller and the barrier operating system, the receiver receiving said at least one mobile signal.

3. The processing system according to claim 1, wherein said add-on controller stores said mobile signal for later processing.

4. The processing system according to claim 3, wherein said mobile signals which, if received by said add-on controller, are stored in corresponding buffers.

5. The processing system according to claim 4, wherein said barrier position indicator comprises:

a magnet adapted to be proximally secured to one of a trailing and a leading edge of the barrier in the barrier operating system; and a pair of inductive switches adapted to be maintained in a track which guides the barrier, wherein each said inductive switch detects a presence of said magnet and generates said barrier position signal received by said add-on controller.

6. The processing system according to claim 5, whereupon detection of a change in the position of the barrier, said add-on controller initiates a timer having a corresponding time period, wherein said add-on controller ignores receipt of said mobile signals for said corresponding time period.

7. The processing system according to claim 1, wherein said at least one mobile transmitter comprises an activity sensor, wherein said at least one mobile signal is only generated if said activity sensor detects a predetermined activity.

* * * * *